(12) United States Patent
Modarresi

(10) Patent No.: US 10,511,681 B2
(45) Date of Patent: Dec. 17, 2019

(54) ESTABLISHING AND UTILIZING BEHAVIORAL DATA THRESHOLDS FOR DEEP LEARNING AND OTHER MODELS TO IDENTIFY USERS ACROSS DIGITAL SPACE

(71) Applicant: Adobe Inc., San Jose, CA (US)

(72) Inventor: Kourosh Modarresi, Los Altos, CA (US)

(73) Assignee: Adobe Inc., San Jose, CA (US)

( * ) Notice: Subject to any disclaimer, the term of this patent is extended or adjusted under 35 U.S.C. 154(b) by 89 days.

(21) Appl. No.: 15/910,679

(22) Filed: Mar. 2, 2018

(65) Prior Publication Data

US 2019/0273789 A1  Sep. 5, 2019

(51) Int. Cl.
| | | |
|---|---|---|
| *H04L 29/08* | (2006.01) | |
| *G06N 3/08* | (2006.01) | |
| *G06N 3/04* | (2006.01) | |
| *G06N 20/00* | (2019.01) | |
| *H04L 29/06* | (2006.01) | |

(52) U.S. Cl.
CPC .............. *H04L 67/26* (2013.01); *G06N 3/04* (2013.01); *G06N 3/08* (2013.01); *G06N 20/00* (2019.01); *H04L 67/42* (2013.01)

(58) Field of Classification Search
CPC .......................... G06Q 10/067; G06Q 30/0269
See application file for complete search history.

(56) References Cited

U.S. PATENT DOCUMENTS

| | | | | |
|---|---|---|---|---|
| 8,175,989 | B1* | 5/2012 | Gopinath | G06N 7/005 |
| | | | | 706/45 |
| 9,251,524 | B2* | 2/2016 | Moritz | G06Q 30/0277 |
| 9,392,074 | B2* | 7/2016 | Aggarwal | G06Q 30/02 |
| 10,142,396 | B2* | 11/2018 | Kennedy | G06F 16/951 |
| 2009/0013024 | A1* | 1/2009 | Aggarwal | G06F 21/10 |
| | | | | 709/201 |
| 2009/0048977 | A1* | 2/2009 | Aggarwal | G06F 21/6254 |
| | | | | 705/50 |
| 2009/0307028 | A1* | 12/2009 | Eldon | G06Q 20/12 |
| | | | | 705/37 |
| 2010/0058381 | A1* | 3/2010 | Begeja | H04N 21/6408 |
| | | | | 725/34 |
| 2011/0264768 | A1* | 10/2011 | Walker | H04N 21/00 |
| | | | | 709/218 |

(Continued)

*Primary Examiner* — Shean Tokuta
(74) *Attorney, Agent, or Firm* — Keller Jolley Preece

(57) ABSTRACT

The present disclosure relates to systems, methods, and non-transitory computer readable media for providing customized digital content to a client device of a target user by generating and utilizing an event-number-specific user classification model. For example, the disclosed systems can train a user classification model based on a set of minimum prior event users who each satisfy a particular event number threshold. The event number threshold can correspond to a number of events that, when implemented by the target user identification system, cause the user classification model to converge. Upon training, the disclosed systems can detect an event associated with the client device of the target user, utilize the trained event-number-specific user classification model to identify the client device corresponding to the target user, and provide customized digital content to the client device of the target user.

20 Claims, 11 Drawing Sheets

(56) References Cited

U.S. PATENT DOCUMENTS

| | | | |
|---|---|---|---|
| 2015/0181289 A1* | 6/2015 | Wheatley | H04N 21/44222 725/14 |
| 2016/0042403 A1* | 2/2016 | Tashiro | G06Q 30/0269 705/14.66 |
| 2016/0048880 A1* | 2/2016 | Linden | G06Q 30/0241 705/14.66 |
| 2018/0114252 A1* | 4/2018 | Bhalgat | G06Q 30/0254 |
| 2018/0183891 A1* | 6/2018 | Zhang | H04L 67/2847 |
| 2018/0276544 A1* | 9/2018 | Chakraborty | G06N 5/022 |
| 2019/0005523 A1* | 1/2019 | Hanegby | G06Q 30/0206 |
| 2019/0034951 A1* | 1/2019 | Cole | G06Q 30/0224 |
| 2019/0098100 A1* | 3/2019 | Anderson | A63F 13/88 |
| 2019/0173966 A1* | 6/2019 | Grokop | G06N 20/00 |

\* cited by examiner

| Threshold 430 | deep learning 432a | SVM 432b |
|---|---|---|
| 1 | 0.358 | 0.371 |
| 2 | 0.379 | 0.368 |
| 3 | 0.454 | 0.438 |
| 4 | 0.491 | 0.466 |
| 5 | 0.538 | 0.510 |
| 6 | 0.574 | 0.537 |
| 7 | 0.600 | 0.567 |
| 8 | 0.611 | 0.587 |
| 9 | 0.641 | 0.619 |
| 10 | 0.670 | 0.639 |
| 11 | 0.679 | 0.650 |
| 12 | .699 | 0.663 |
| 13 | 0.709 | 0.682 |
| 14 | 0.727 | 0.691 |
| 15 | 0.735 | 0.715 |
| 16 | 0.766 | 0.726 |
| 17 | 0.757 | 0.736 |
| 18 | 0.769 | 0.742 |
| 19 | 0.788 | 0.756 |
| 20 | 0.798 | 0.781 |
| 50 | 0.896 | 0.904 |
| 59 | 0.930 | 0.931 |

ESTABLISHING AND UTILIZING BEHAVIORAL DATA THRESHOLDS FOR DEEP LEARNING AND OTHER MODELS TO IDENTIFY USERS ACROSS DIGITAL SPACE

BACKGROUND

Advancements in computing devices and user identification technology have led to a variety of innovations in providing personalized digital content to client devices of individual users. For example, user identification systems are now able to analyze a digital profile of a user to identify content that interests the particular user and then transmit the digital content as part of digital interactions with client devices of the user.

Despite these advances however, conventional user identification systems continue to suffer from a number of disadvantages, particularly in the efficiency, accuracy, and flexibility of identifying client devices corresponding to individuals in providing customized digital content. For instance, while conventional user identification systems can identify digital content that might interest a given user, these systems often require large amounts of computer memory and other computing resources to identify client devices corresponding to the user. Indeed, conventional user identification systems inefficiently analyze all (or nearly all) available user profiles to identify a target user, requiring significant memory and processing power. The time and processing power required by these conventional systems is particularly problematic in light of the need to provide digital content across computing systems in real-time (i.e., near instantaneously) in many circumstances.

In addition, conventional user identification systems are often inaccurate. More specifically, conventional user identification systems often misclassify client devices of individual users and thus provide incorrect digital content. This is a particularly significant problem because data regarding individual users are available and recorded in a variety of places all over digital space (including across various devices and channels utilized to access content via the Internet). Accordingly, different users have different information profiles and different amounts of information to utilize in classifying target users. Accordingly, the accuracy of predictions can vary widely with variability in available data utilized to generate predictions within conventional user identification systems.

Moreover, many conventional user identification systems are inflexible. Indeed, given the accuracy problems just discussed, some user identification systems only provide targeted digital content to users that are definitively identified (e.g., based on a known IP address or known log-in information). Such systems thus rigidly provide customized digital content to known users but fail to flexibly identify and provide digital content for users based on available digital characteristics.

Thus, there are several disadvantages with regard to conventional user identification systems.

SUMMARY

One or more embodiments described herein provide benefits and solve one or more of the foregoing or other problems in the art by providing systems, methods, and non-transitory computer readable media that quickly and efficiently identify client devices of individual users by utilizing an event number threshold to generate and apply a user classification model. For instance, the disclosed systems can determine a minimum threshold of behavioral data (e.g., an event number threshold) for individual users that cause a user classification model to converge. The disclosed systems can then utilize the minimum threshold to select users utilized to generate the user classification model. For instance, the disclosed systems can identify a set of users (i.e., minimum prior event users) that satisfy an event number threshold, utilize the set of users to generate the user classification model, and then utilize the user classification model to identify and provide digital content to target users. In this manner, the disclosed systems can generate and utilize a user classification model that efficiently analyzes user data, accurately converges to identify target users, and flexibly utilizes available behavioral data to provide personalized digital content to target users.

To illustrate, in one or more embodiments, the disclosed systems utilize an event number threshold (e.g., five events) to identify a set of minimum prior event users, where each minimum prior event user within the set of minimum prior event users satisfies the event number threshold (e.g., users with at least five previous events). The systems can further generate a user classification model (e.g., a deep neural network, support vector machine, nearest neighbor algorithm, or random forest algorithm) using the identified set of minimum prior event users. In response to detecting an event associated with a client device of a target user (e.g., in response to detecting the sixth event), the systems can utilize the generated user classification model to identify the target user as one of the minimum prior event users within the set of minimum prior event users (e.g., one of the users with five previous events). Additionally, the disclosed systems can provide digital content to the target user based on identifying the target user as one of the minimum prior event users within the set of minimum prior event users.

The disclosed systems, methods, and non-transitory computer-readable media provide several advantages over conventional user identification systems. For example, by generating and analyzing a set of minimum prior event users, the disclosed systems can avoid unnecessary and inefficient analysis of users with insufficient information to provide accurate identification of client devices of individual users (and provide digital content across computer networks in real-time). Furthermore, by utilizing a user classification model trained on minimum prior event users, the disclosed systems can ensure convergence and accurate user classifications in providing customized digital content. Moreover, the disclosed systems can increase flexibility by utilizing a wide array of available behavioral data, without relying on detecting rigid identification information, such as IP address or log-in information. Indeed, the disclosed systems can rely only on behavioral data and avoid using personal data such as name, address, phone number, IP address, user ID, etc.

Additional features and advantages of the present application will be set forth in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
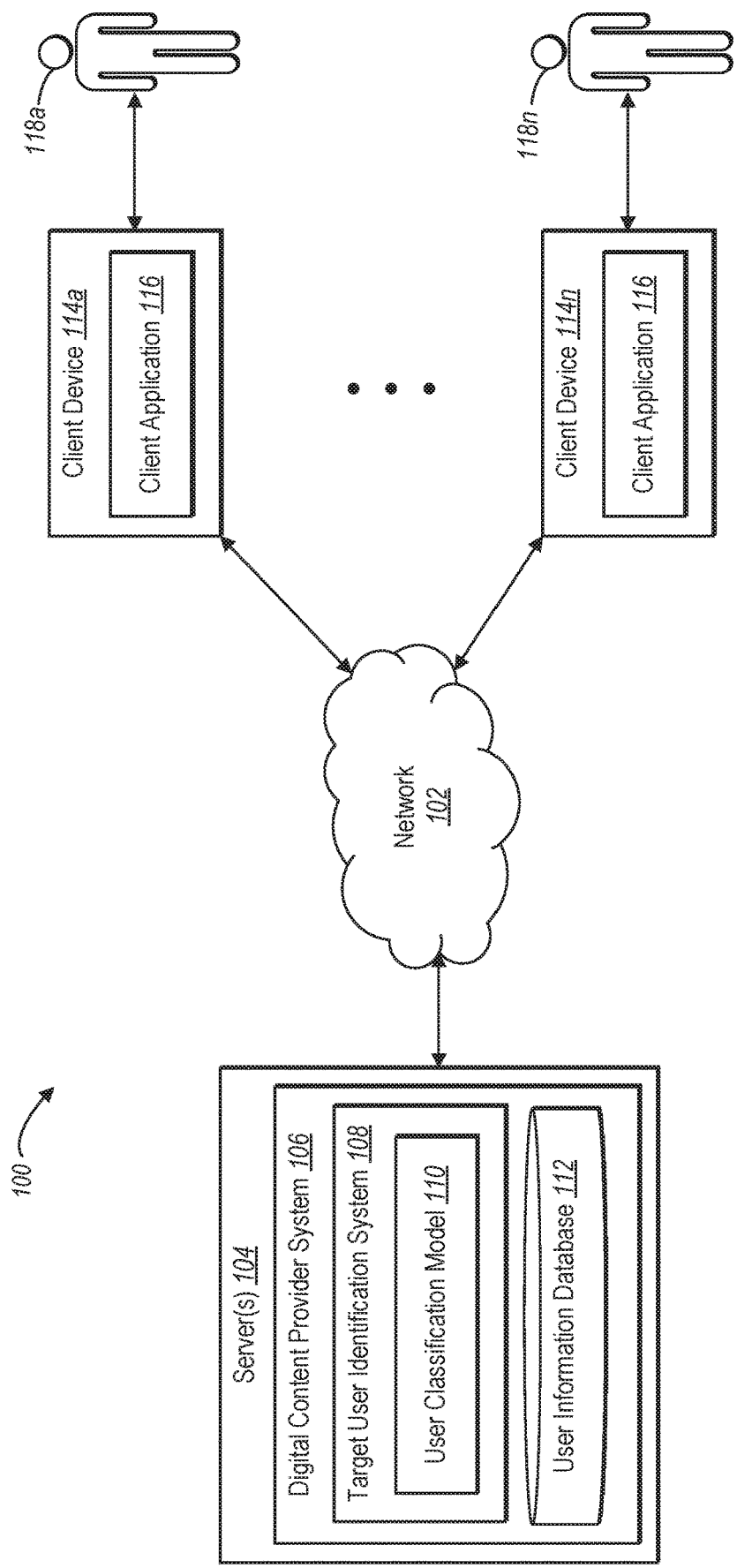
FIG. 1 illustrates an example environment for implementing a target user identification system in accordance with one or more embodiments.

One or more embodiments described herein provide benefits and solve one or more of the foregoing or other problems in the art with a target user identification system that identifies individual users by utilizing an event number threshold to generate a user classification model based on a set of minimum prior event users. In particular, the target user identification system can determine a minimum threshold of prior behavioral data for individual users (e.g., an event number threshold) that causes a user classification model to converge (i.e., to correctly classify users). The target user identification system can then generate a user classification model reflecting the distribution of each known user satisfying the minimum threshold. In particular, the target user identification system can select users based on the event number threshold (e.g., users with at least five events), utilize behavioral data of the selected users to generate a user classification model, and apply the user classification model to identify client devices of target users.

For instance, in one or more embodiments, the target user identification system can utilize an event number threshold (e.g., five events) to identify a set of minimum prior event users that each satisfy the event number threshold. Moreover, the target user identification system can utilize the set of minimum prior event users to train the user classification model. In response to detecting an event associated with a client device of a target user (e.g., a sixth event of the target user), the target user identification system can then utilize the trained user classification model to identify the target user as one of the minimum prior event users from the set of minimum prior event users. The target user identification system can further provide customized, user-specific digital content to the client device of the target user based on the determination that the target user corresponds to the first minimum prior event user.

As just mentioned, in one or more embodiments, the target user identification system can utilize an event number threshold. In particular, the target user identification system can utilize an event number threshold that causes one or more user classification models to converge in identifying individual users. For example, the target user identification system can determine an event number threshold by iteratively testing the accuracy of one or more user classification models with different sets of training data reflecting different test thresholds. By comparing accuracy of these test user classification models, the target user identification system can determine an event number threshold that causes the user classification model to converge.

In addition, as mentioned, the target user identification system can utilize the event number threshold to generate a set of minimum prior event users. To illustrate, in one or more embodiments, the target user identification system utilizes an event number threshold of five events and identifies users that satisfy the event number threshold. Specifically, the target user identification system can filter a repository of user behavioral data to identify only those users with five prior identified events. Moreover, as the target user identification system detects additional events for additional users, the target user identification system can actively add to the set of minimum prior event users (e.g., as additional users satisfy the event number threshold).

Moreover, the target user identification system can generate a user classification model based on the identified set of minimum prior event users. More specifically, the user classification model can train a user classification model to identify users by utilizing the set of minimum prior event users as training data for the user classification model. In some embodiments, the target user identification system can implement a user classification model in the form of a deep neural network, a nearest neighbor algorithm, a random forest algorithm, or a support vector machine. In embodiments where the target user identification system implements a deep neural network, for example, the target user identification system trains the deep neural network to identify a target user using the set of minimum prior event users as training data.

As mentioned above, the target user identification system can detect an event associated with a target user and utilize a trained user classification model to identify (e.g., classify) the target user. To illustrate, the target user identification system detects a click event (or other interaction) with a client device by a target user. In response, the target user identification system analyzes the event and features corresponding to the event utilizing user classification model to identify the target user. More specifically, the target user identification system can apply the user classification model the event associated with the target user and determine whether the user corresponds to a minimum prior event user from within the set of minimum prior event users.

As will be described in further detail below, the target user identification system can identify the target user by determining probabilities that the target user corresponds to each minimum prior event user of the set of minimum prior event users. Indeed, in one or more embodiments, the user classification model reflects the distribution of each minimum prior event user in the set of minimum prior event users. Accordingly, the target user identification system can utilize the user classification model to determine, for each minimum prior event user within the set of minimum prior event users, a probability that the target user corresponds to the minimum prior event user. Additionally, the target user identification system can compare each of these probabilities to identify a target user. Specifically, the target user identification system can identify the minimum prior event user with the highest probability as the minimum prior event user that corresponds to the target user.

As mentioned, the target user identification system further provides digital content to the target user. Indeed, based on identifying the target user, the target user identification system can provide digital content to the client device of the target user that is customized specifically for the target user. For instance, the target user identification system can maintain user information associated with each minimum prior event user, including digital content associated with each minimum prior event user. Accordingly, based on determining that the target user corresponds to the first minimum prior event user, the target user identification system can provide digital content associated with the first minimum prior event user.

The target user identification system can also actively monitor user events, update user classification models based on the monitored user events, identify additional target users based on the user classification models, and provide digital content to client devices of the target users. To illustrate, in one or more embodiments, the target user identification system detects five events with a first user. In response to detecting the five events corresponding to the first user, the target user identification system adds the first user to a set of minimum prior event users (e.g., because the first user satisfies a prior event threshold of five events) and utilizes the set of minimum prior event users to train a user classification model. The target user identification can then detect an additional event (i.e., a sixth event) and identify the first user based on the additional (sixth) event utilizing the user classification model. Moreover, in response, the target user identification system can provide customized digital content to the client device of the first user.

The target user identification system provides several advantages over conventional user identification systems. For example, the target user identification system improves efficiency of computing devices implementing the target user identification system. For instance, by utilizing an event number threshold, the target user identification system can reduce the amount of data analyzed and processing power to generate one or more user classification models. Specifically, the target user identification system can analyze a set of minimum prior event users to generate a user classification model rather than an entire repository of user data, reducing computer memory and processing burden. Thus, the target user identification system can more efficiently provide digital content to client devices of target users in real-time (e.g., near-instantaneously as the client devices access and interact with digital assets)

The target user identification system can also improve accuracy over conventional systems. For example, by utilizing a user classification model generated based on an event number threshold, the target user identification system can cause the user classification model to converge as additional events for users are detected and analyzed. Accordingly, the target user identification system generates improved, accurate classifications for target users and provides more precise digital content to client devices corresponding to target users.

In addition, the target user identification system also improves flexibility. For instance, in one or more embodiments, the target user identification system utilizes behavioral data (e.g., events) detected for individual users in classifying target users. Accordingly, the target user identification system can detect high-volume digital interactions, such as clicks, website hits, digital purchases, or other data, and flexibly identify users based on this behavioral data. The target user identification system can thus identify users even without conventional rigid identification categories, such as IP address or log-in information.

As illustrated by the foregoing discussion, the present disclosure utilizes a variety of terms to describe features and benefits of the target user identification system. Additional detail is provided regarding the meaning of these terms as used in this disclosure. For example, as used herein, the term "digital content" refers to content or data that is transmitted over a communication network (e.g., the Internet or an intranet). In particular, digital content includes webpage content, targeted digital campaign content, application content, social networking content, search engine content, or other content transmittable over a network. For example, digital content can include text, images, audio, and/or audio-visual content. For instance, digital content can include images on a webpage, a list of search results, displayed features of an application, or in image targeted specifically to a user as part of a digital content campaign.

As used herein, the term "user" refers to an individual, group of individuals, company, business, or other entity associated with a client device. As used herein, the term "client device" refers to a computing device of a user. In particular, a client device can refer to a computing device such as a mobile device, a smart wearable device, a laptop computer, or a desktop computer associated with a user (as described below in relation to FIG. 10). A user can refer to a subscriber of a particular software-as-a-service ("SAAS") application or can refer to a visitor of a web site or a user of a search engine. For example, the term "known user" refers to a user that is known to the target user identification system. More specifically, a known user refers to a user for whom the target user identification system has previously detected events (and correlated the detected events with the user, such as in a user profile). In addition, a known user can refer to a user whose identity is known to the target user identification system.

In addition, as used herein, the term "target user" refers to a user that the target user identification system identifies (e.g., assigns or correlates to a user profile) or seeks to identify. Thus, a target user includes a user that has not yet been identified or recognized (e.g., has not been correlated to a known user) by the target user identification system. In particular, the term target user can include a user of a client device that has not been correlated to a profile of a known user. For example, a target user includes a user that visits a website or utilizes a particular application (e.g., an SAAS application) without any log-in information, credentials, and/or identification information. The target user identification system can detect the visit to the website or the application login by the target user, and the target user identification system can proceed to identify the target user (e.g., determine that the target user corresponds to a user profile of a known user).

As also used herein, the term "minimum prior event user" refers to a user for whom the target user identification system has previously detected and/or identified at least a threshold number of events. For example, a "set of minimum prior event users" includes a group of users who each satisfy an event number threshold. For example, a minimum prior event user can include a user who is associated with a number events that meets or exceeds the event number threshold.

As just mentioned, a minimum prior event user includes a user who satisfies an event number threshold (e.g., a user with sufficient events in a corresponding user profile that satisfy the event number threshold). As used herein, the term "event number threshold" refers to a threshold amount of data corresponding to a user. In particular, event number threshold can include a minimum number of events. For example, an event number threshold can include a minimum number of events determined to cause a user classification model to converge. As will be described in further detail below, in some embodiments, the event number threshold is five events. In other embodiments, the event number threshold is more than five events (e.g., six events, ten events, twenty events, etc.).

As used herein, the term "event" refers to an action of a user via a client device (e.g., digital behavioral data). In particular, an event can refer to a particular instance of user behavior such as a particular action that a user performs by way of a client device. For example, an event can include opening an application, visiting a website, purchasing a product, clicking a link, submitting a search query, exiting a website, exiting an application, or other user action within a digital environment. From the point of view of information, an event can be random, with random amounts of features, information, or variation. As a result, using the law of averages over a large sample size, any event in a collection of events can be analyzed as having an average (of all possible events) amount of variation or information.

In addition, an event can include a varying number of event features. As used herein, the term "event feature" refers to digital information, data, and/or features describing an event. In particular, an event feature includes categories of contextual information corresponding to an event. Indeed, a single event can include upwards of 70 (e.g., 73) event features, where each event feature defines the event. For example, event features can include one or more of, a time of day of the event, a duration of the event, a type of event (e.g., click, purchase, or navigation), a web browser associated with the event (e.g., a web browser type, version, etc.), a geographic location of the client device associated with the event, a type of client device (e.g., a smartphone, a smart wearable, a laptop computer, etc.) associated with the event, a brand of client device associated with the event (e.g., a SAMSUNG device, a GOOGLE device, an APPLE device, a MICROSOFT device, etc.), or an operating system of the client device associated with the event (e.g., ANDROID, IOS, MAC OS, WINDOWS, LINUX, etc.). As mentioned above, in one or more embodiments, the target user identification system 108 considers only behavioral events such as clicks, search queries, and other interactions associated with users and does not consider physical data such as IP address, login data, or cookies. The number of event features determined for a particular can also vary. For instance, some events can include a relatively high number of event features (e.g., 10, 20, or 70 event features) while others may include fewer event features (e.g., 5 or 10 event features).

As mentioned, the target user identification system generates a user classification model based on identifying a set of minimum prior event users. As used herein, the term "user classification model" refers to a digital algorithm that can be tuned or trained based on inputs to approximate unknown functions. In particular, a user classification model can refer to a model that utilizes algorithms to learn from, and make predictions based on, known data by analyzing the known data to generate outputs that reflect patterns or attributes of the known data. More specifically, a user classification model can refer to a model that can analyze a set of minimum prior event users to determine a distribution of each known user users within the set of minimum prior event users. Accordingly, a user classification model can predict known users that correspond with a target user based on detecting an event associated with the target user. For example, the user classification model can include one or more of a deep neural network, a nearest neighbor algorithm, a random forest algorithm, or a support vector machine.

A "deep neural network" (sometimes described as a "neural network") refers to a particular type of computer model (e.g., user classification model) that can progressively improve its ability to perform particular tasks by considering training examples. In particular, a deep neural network can include a neural network that has a plurality of layers (e.g., M layers), including multiple hidden layers between an input layer and an output layer. For example, a deep neural network can include an output layer such as a softmax layer with M hidden layers between the softmax layer and an input layer. Deep neural networks can model complex non-linear relationships by generating compositional models that represent data as layered compositions of information. To illustrate, in one or more embodiments the target user identification system utilizes a neural network (i.e., a deep neural network) trained to classify a target user.

A "nearest neighbor algorithm" (sometimes referred to as the "k-nearest neighbors algorithm") refers to a computer algorithm that identifies the closest points to a sample within a feature space. In particular, the term nearest neighbor algorithm includes a k-nearest neighbor classification algorithm that generates a class membership for a sample by analyzing k nearest neighbor classes within the feature space. Thus, in relation to the target user identification system, a "nearest neighbor algorithm" includes a computer algorithm that classifies a target user by identifying the nearest known users from a set of minimum prior event users within the features space. Thus, the training data for a nearest neighbor algorithm can consist of vectors in a multidimensional space (e.g., the feature space), and the nearest neighbor algorithm can determine, among the k known users within the training data, which known users are closest to a target user. For example, when k=1, the nearest neighbor algorithm can identify a nearest known user (and also avoiding misclassification under a Gaussian distribution assumption).

A "random forest algorithm" refers to a computer algorithm that operates based on constructing a plurality of decision trees and generating an output based on the decision trees. In particular, the random forest algorithm includes an ensemble-based model that generates many decision trees based on bootstrapped data sets. In addition, the random forest algorithm can implement a voting technique to classify a new observation (e.g., a detected event of a target user). The random forest algorithm can average multiple deep decision trees trained on different parts of the same data set to reduce variance.

A "support vector machine" ("SVM") refers to a computer learning model that analyzes training data marked as belonging to one of two possible categories. By way of this non-probabilistic binary linear classification, the SVM can assign new examples (e.g., a target user) to one category or the other based on its training. In some embodiments, a support vector machine can refer to "support vector clustering" ("SVC"). Support vector clustering can refer to a type of SVM that partitions data into groups according to some criterion to better organize the data. For example, an SVC can implement clustering boundaries in regions of the data space.

As mentioned, the target user identification system trains a user classification model by analyzing training data. As used herein, the term "train" refers to utilizing information to tune or teach a particular user classification model. The term "training" (used as an adjective or descriptor, such as "training input") refers to information or data utilized to tune or teach the user classification model.

More detail regarding the target user identification system will now be provided with reference to the figures. For example, FIG. 1 illustrates a schematic diagram of an example environment 100 for implementing a target user identification system 108 in accordance with one or more embodiments. An overview of the target user identification system 108 is described in relation to FIG. 1. Thereafter, a more detailed description of the components and processes of the target user identification system 108 is provided in relation to the subsequent figures.

As shown in FIG. 1, the environment 100 includes server(s) 104, client devices 114a-114n (referred to herein collectively as "client devices 114") associated with users 118a-118n (referred to herein collectively as "users 118"), and a network 102. Each of the components of the environment 100 can communicate via the network 102, and the network 102 may be any suitable network over which computing devices can communicate. Example networks are discussed in more detail below in relation to FIG. 10.

As shown in FIG. 1, the environment 100 includes the client devices 114. The client devices can include a variety of computing devices, including smartphones, personal computers, laptop computers, or other computing devices described in relation to FIG. 10. Although FIG. 1 illustrates a single client device for each of the users 118, the users 118 can have multiple different client devices. The target user identification system 108 can detect events in relation to a variety of different client devices corresponding to each of the users 118a-118n.

As illustrated in FIG. 1, the environment 100 includes the server(s) 104. The server(s) 104 may generate, store, receive, and transmit any type of electronic data, such as application features, digital files, user activity information, electronic messages, metadata, etc. For example, the server(s) 104 may transmit data to a client device to provide digital content, as mentioned above. Furthermore, the server(s) 104 can communicate with a client device via network 102 to receive user activity information. In some embodiments, the server(s) 104 comprises a content server. The server(s) 104 can also comprise a communication server, a web-hosting server, a social networking server, or a SAAS server.

As shown in FIG. 1, the server(s) 104 also include the target user identification system 108 as part of a digital content provider system 106. The digital content provider system 106 can communicate with the client devices 114 to provide digital content such as web site content, search results, application content, etc. For instance, the digital content provider system 106 can refer to a SAAS system, a web hosting system, a search engine system, or a social networking system.

Although FIG. 1 depicts the target user identification system 108 located on the server(s) 104, in some embodiments, the target user identification system 108 may be implemented by (e.g., located entirely or in part) on one or more other components of environment 100. For example, the target user identification system 108 may be implemented by the client devices 114.

Moreover, in one or more embodiments, the target user identification system 108 is implemented on a third-party server. For example, in such embodiments, the server(s) 104 may be associated with a digital content publisher and a third-party server can host the target user identification system 108. Specifically, the third-party server can receive event information regarding a target user, provide identification information for the target user from the third-party server to the digital content publisher by way of the server(s) 104, and the server(s) 104 can select and provide digital content for display to a client device (e.g., the client device 114a) of the target user.

As further illustrated in FIG. 1, the target user identification system 108 may include a user classification model 110. As described in further detail below, the target user identification system 108 can implement the user classification model 110 to analyze information stored within the user information database 112. For example, the target user identification system 108 can train the user classification model 110 based on information stored within the user information database 112. Specifically, as will be described in further detail below, the target user identification system 108 can select minimum prior event users from the user information database (utilizing an event number threshold) and generate a trained user classification model 110 based on the minimum prior event users to identify a target user from among the users 118.

As mentioned, the digital content provider system 106 can further include a user information database 112. In particular, the user information database 112 can store user information (e.g., user profiles) pertaining to events associated with each respective client device 114. For example, the user information database 112 can include information such as event features for each event associated with client devices 114. The user information database 112 can also store a history of previously-accessed, preferred, or relevant digital content associated with the users 118. Accordingly, the target user identification system 108 can communicate with the user information database 112 to access the event-related information and/or digital content-related information stored therein. In some embodiments, for instance, the target user identification system 108 communicates with the user information database 112 directly, where the target user identification system 108 and the user information database 112 are on the same device (e.g., server(s) 104). In other embodiments not illustrated in FIG. 1, however, the user information database 112 can be located externally from the server(s) 104 or otherwise extraneous to the target user identification system 108. In these embodiments, the target user identification system 108 can communicate with the user information database 112 via the network 102.

As mentioned, the target user identification system 108 may provide digital content to one or more of the client devices 114. Indeed, the target user identification system 108 can distribute (e.g., via the network 102) digital content to users 118 by way of the client devices 114. For example, the target user identification system 108 can generate and/or provide digital content customized for specific users based on information within the user information database 112.

As illustrated in FIG. 1, the client devices 114 each includes a client application 116. The client application 116 may be a web application or a native application installed on a client device (e.g., a mobile application, a desktop application, etc.). The client application 116 can interface with the target user identification system 108 to provide user event information to the server(s) 104, and to present digital content from the server(s) 104. Indeed, the client application 116 can receive data from the target user identification system 108 and present, for display, a webpage, a search result, a social networking feed, or an application interface to the users 118.

In some embodiments, though not illustrated in FIG. 1, the environment 100 may have a different arrangement of components and/or may have a different number or set of components altogether. For example, some client devices 114 may communicate directly with the target user identification system 108, bypassing the network 102. Additionally, the user information database 112 may be housed within the target user identification system 108, along with the user classification model 110. Further, the target user identification system 108 can be implemented in a variety of different ways across the server(s) 104, the network 102, and the client devices 114.

Figure 2:
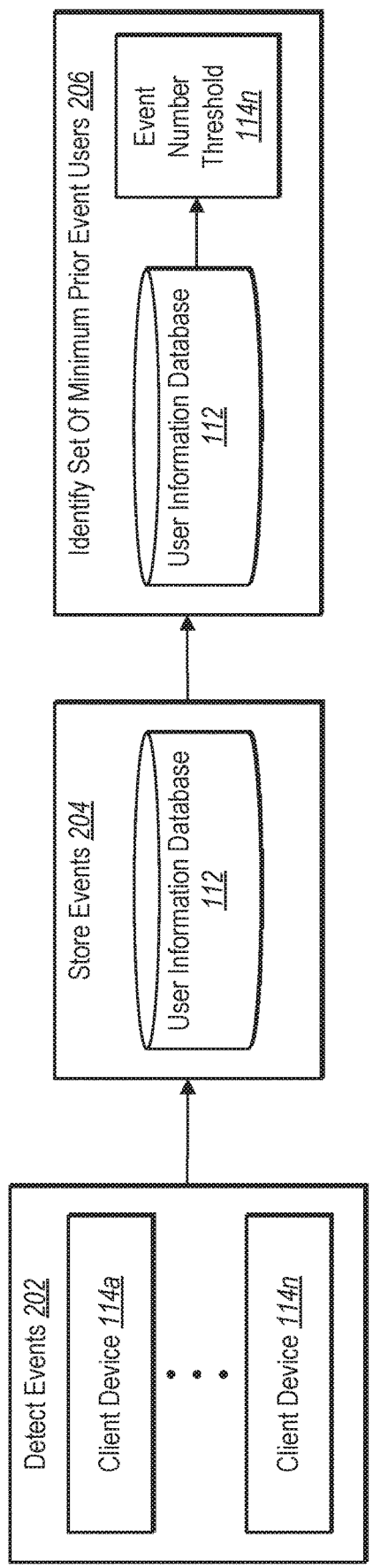
FIG. 2 illustrates identifying a set of minimum prior event users in accordance with one or more embodiments.

As described above, the target user identification system 108 can detect events associated with client devices to generate a user classification model based on a set of minimum prior event users. For example, FIG. 2 illustrates the target user identification system 108 detecting events associated with the client devices 114 to identify a set of minimum prior event users to train a user classification model (e.g., the user classification model 110). As shown in FIG. 2, the target user identification system 108 performs an act 202 of detecting an event associated with a particular client device 114a. For example, the target user identification system 108 detects a login of user 118a into a particular application. The target user identification system 108 detect this event and can determine various event features associated with the event. In particular, the target user identification system 108 can detect event features such as a time of the event, a geographic location of the event, an application type associated with the event, an operating system of the client device 114a used to access the application, etc. From the point of view of information, an event can be random with a random amount of information or variation, and, as a result, using the law of large number in relation to a large sample size, it has an average (of all possible events) amount of variation or information.

Based on detecting the event, including the corresponding event features, the target user identification system 108 can associate the event with the user 118a. In particular, as shown in FIG. 2, the target user identification system 108 can further perform an act 204 of storing the event associated with the client device 114a of the user 118a within the user information database 112. In particular, the target user identification system 108 can store the event including its corresponding event features for the user 118a.

Furthermore, the target user identification system 108 can detect additional events associated with the user 118a. In particular, the target user identification system 108 can detect the user 118a visiting a webpage, opening another application, accessing a website, clicking a link within a web site, purchasing a product via a web site, or some other type of event. As mentioned, the target user identification system 108 can determine features associated with each event detected for one or more client devices of a given user (e.g., user 118a). Accordingly, the target user identification system 108 can gather events, each event including its own event features, corresponding to the user 118a.

In addition, the target user identification system 108 can perform the act 202 by detecting an event associated with a different client device 114b. For example, as described above in relation to client device 114a, the target user identification system 108 can detect events such as logins, webpage visits, etc., associated with the client device 114b of the user 118b. The target user identification system 108 can also determine event features for each detected event.

Upon detecting each event and determining its event features, the target user identification system 108 can perform the act 204 to storing the events (including event features) within the user information database 112. Indeed, the target user identification system 108 can maintain the user information database 112 for all the users 118 and can continuously add to the user information database 112 each time the target user identification system 108 detects a new event.

As mentioned, the target user identification system 108 can detect events associated with each of the client devices 114 of the users 118 and can store the events with corresponding client devices and users within the user information database 112.

In addition to the acts 202 and 204, the target user identification system 108 can further perform an act 206 of identifying a set of minimum prior event users. In particular, the target user identification system 108 can identify minimum prior event users that satisfy an event number threshold. Specifically, the target user identification system 108 can determine minimum prior events that have at least a threshold number of events within the user information database 112.

For example, in relation to FIG. 2, the target user identification system performs the act 206 by identifying a set of minimum prior event users from among the users 118 that satisfy an event number threshold of five events. Thus, a minimum prior event user is a user associated with at least five events—i.e., a user for whom the target user identification system 108 detects at least five events within the user information database 112. Accordingly, the target user identification systems filters users within the user information database 112 based on the event number threshold. Specifically, the target user identification system 108 identifies some users with fewer than five events and identifies other users with five or more events. For each user with at least five identified events in the user information database 112, the target user identification system 108 adds the user to a set of minimum prior event users. The target user identification system 108 excludes users with fewer than five events in the user information database 112. In this way, the target user identification system 108 identifies a set of minimum prior event users that the target user identification system 108 can use to train the user classification model 110.

As mentioned above, in one or more embodiments, the event number threshold is a number of events that causes the user classification model 110 to converge (as described in greater detail below in relation to FIGS. 4A-4C). In some embodiments, however, the target user identification system 108 can operate using an event number threshold different than (e.g., greater than or less than) five events. Indeed, the target user identification system 108 can to receive user input (e.g., from an administrator) to set the event number threshold, or else can automatically determine an event number threshold for a particular user classification model or based on a unique set of users.

The target user identification system 108 can also actively monitor and update the user information database 112 and the set of minimum prior event users. For example, the target user identification system 108 can detect events from client devices corresponding to individual users and actively identify those users with sufficient information to satisfy the event number threshold. As the target user identification system 108 detects additional users that satisfy the event number threshold, the target user identification system 108 can also update the set of minimum prior event users.

Figure 3:
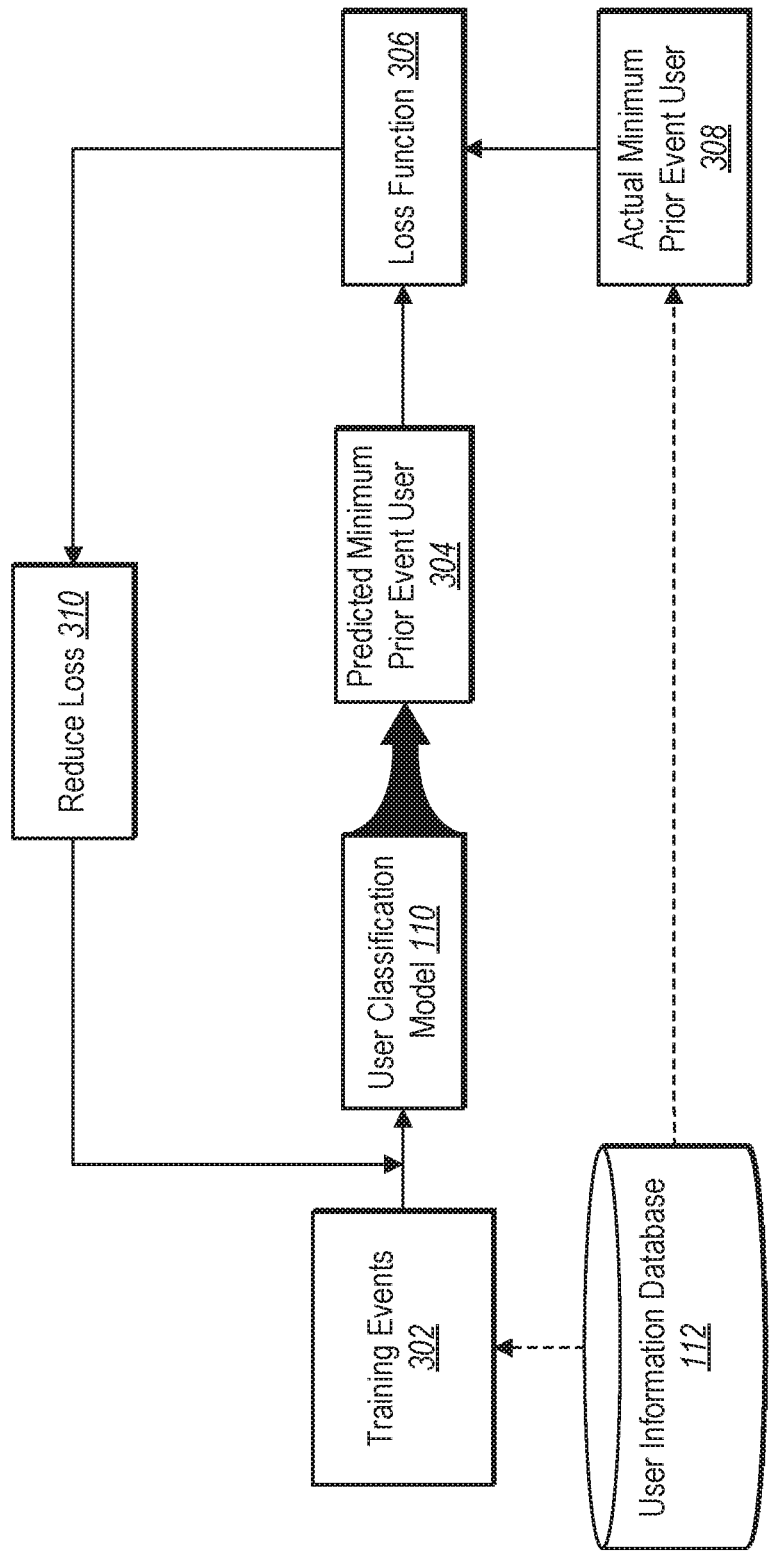
FIG. 3 illustrates training a user classification model in accordance with one or more embodiments.

As mentioned, the target user identification system 108 can also train a user classification model based on the identified set of minimum prior event users. Indeed, FIG. 3 illustrates training the user classification model 110 in accordance with one or more embodiments. In particular, as illustrated in FIG. 3, the target user identification system 108 trains the user classification model 110 using a set of minimum prior event users 302 (e.g., a set of minimum prior event users identified as described in relation to FIG. 2). Specifically, the user classification model 110 trained in relation to FIG. 3 is a deep neural network; however, the user classification model 110 can train any user classification model using the set of minimum prior event users.

As illustrated in FIG. 3, the target user identification system 108 accesses user information database 112 to retrieve information pertaining to the users 118 and events associated with the client devices 114 of the users 118. In particular, the target user identification system 108 accesses the set of minimum prior event users to use as training data to train the user classification model 110. For example, the target user identification system 108 accesses a set of training events 302 associated with the set of minimum prior event users to input into user classification model 110. To elaborate, the target user identification system 108 inputs a set of training events 302 corresponding to users that satisfy the event number threshold.

To train the user classification model 110, the target user identification system 108 inputs training events 302 associated with a user (e.g., user 118a). The training events 302 can include at least the event number threshold of events (e.g., five events). In addition, each of the training events can have corresponding event features.

In one or more embodiments, the target user identification system 108 utilizes all available event features for each event to train the user classification model 110. In other embodiments, the target user identification system 108 selects a subset of event features for training. In this manner, the target user identification system 108 can simulate realistic use cases where many features are missing.

For example, the target user identification system 108 can train the user classification model 110 by randomly selecting a particular number of event features to use as the basis for training the user classification model 110. To illustrate, in some embodiments, the target user identification system 108 randomly determines a number of event features between 10 and 30 and samples that many features of each of the training events 302 for each user. The target user identification system 108 can utilize a mask vector to hide features in training the user classification model 110. In other embodiments, the target user identification system 108 can utilize a different number of event features for each of the training events 302.

As shown in FIG. 3, the user classification model 110 can analyze the training events 302 to generate a predicted classification. In particular, the user classification model can analyze the training events 302 to generate a predicted minimum prior event user 304 that corresponds with the training events 302. The predicted minimum prior event user 304 can comprise a binary classification and/or one or more probabilities.

For example, in relation to FIG. 3, the target user identification system 108 utilizes the user classification model 110 to determine probabilities that the training events 302 correspond to particular minimum prior event users from the set of minimum prior event users. More specifically, the target user identification system 108 utilizes the user classification model 110 to determine, for each minimum prior event user, a probability that the target events 302 corresponds to the minimum prior event user. For example, the target user identification system 108 can determine a first probability (e.g., 10%) that a target event corresponds to a first user, and a second probability (e.g., 60%) that a target event corresponds to a second user.

The user classification model 110 can also generate a specific (e.g., binary) classification based on the probability determinations. For instance, the target user identification system 108 can utilize the user classification model 110 to identify the minimum prior event user with the highest probability as the predicted minimum prior event user 304. To illustrate, the target user identification system 108 can compare the probabilities of each minimum prior event user corresponding to the training events 302 and select the minimum prior event user with the highest probability to designate as the predicted minimum prior event user 304.

To elaborate, the target user identification system 108 can compute the probability distribution of each minimum prior event user within the user information database 112. Thus, for the $i^{th}$ minimum prior event user, the distribution can be represented as a Gaussian distribution of $N(\mu_i, \sigma_i)$, where $\mu_i$ is the mean and $\sigma_i$ is the standard deviation. Based on the distribution of each user, the target user identification system 108 can compute the probabilities of the training events 302 belonging to any of the user distributions. For instance, the target user identification system 108 can determine a probability that a user corresponding to the training events 302 has the same distribution as an already-established minimum prior event user distribution.

Upon determining the probability of a user corresponding to each probability distribution (e.g., for each distribution of the set of minimum prior event users), the target user identification system 108 identifies the minimum prior event user with the highest probability as the predicted minimum prior event user 304.

As shown in FIG. 3, the target user identification system 108 also compares the predicted minimum prior event user 304 with a corresponding actual minimum prior event user 308. In particular, the target user identification system 108 accesses the user information database 112 to identify the actual minimum prior event user 308 that corresponds with the set of training events 302 (e.g., user 118a). The target user identification system 108 then uses the identified actual minimum prior event user 308 as a ground truth for training the user classification model 110. Accordingly, the target user identification system 108 compares the predicted minimum prior event user 304 output by the user classification model 110 with the actual minimum prior event user 308.

As shown in FIG. 3, to compare the predicted minimum prior event user 304 with the actual minimum prior event user 308, the target user identification system 108 applies a loss function 306. Indeed, in the embodiment of FIG. 3 (where the user classification model 110 is a deep neural network), the target user identification system 108 can apply a loss function such as a cross-entropy loss function. In other embodiments, the target user identification system 108 can apply a different loss function such as Bayesian loss function, a risk function, a quadratic loss function, or a utility function. By applying the loss function 306, the target user identification system 108 determines a measure of loss (e.g., a distance, difference, or measure of error) between the predicted minimum prior event user 304 and the actual minimum prior event user 308.

As shown, the target user identification system 108 can train the user classification model 110 to improve by performing act 310 of reduce the calculated loss between the predicted minimum prior event user 304 and the actual minimum prior event user 308. In particular, the target user identification system 108 can modify the parameters of the user classification model 110 to reduce the loss. For example, in relation to the deep neural network user classification model of FIG. 3, the target user identification system 108 can perform the act 310 by implementing an Adam optimizer technique. More specifically, the target user identification system 108 can calculate an exponential moving average of the gradient (e.g., the uncentered variance of the loss function 306) and the squared gradient, in addition to parameters to control decay rates of these moving averages. In other embodiments, the target user identification system 108 can perform one of a number of other potential error reduction techniques such as a classical stochastic gradient descent, mean squared error reduction, or standard error reduction.

The user classification system 108 can perform the process illustrated in FIG. 3 in relation to a plurality of training events corresponding to a plurality of minimum prior event users. In particular, the target user identification system 108 can identify a second set of training events (each event including its accompanying event features) for a second user (e.g., user 118b) from the user information database 112 to input into the user classification model 110, whereupon the user classification model 110 generates a second predicted minimum prior event user based on the second set of training events. The target user identification system 108 can further compare the second predicted minimum prior event user with a second actual minimum prior event user (e.g., user 118b) by applying the loss function 306 as described above. In addition, the target user identification system 108 can perform the act 310 to reduce the error between the second predicted minimum prior event user and the second actual minimum prior event user.

By performing the process illustrated in FIG. 3 using a plurality of training events and users (e.g., for thousands of users that satisfy the event minimum threshold), the user classification model 110 trains the user classification model 110 to accurately classify (e.g., identify) users. For example, the target user identification system can train the user classification model 110 until satisfying a threshold number of iterations or until the target user identification system converges (e.g., until deviation in changes to the model satisfy a threshold or until error values between predicted and ground truth classifications satisfy a threshold). Upon training, the target user identification system 108 can identity a target user based on detecting a new event associated with a client device of the target user.

In some embodiments, the target user identification system 108 can utilize a negative training process to train the user classification model 110. To elaborate, the target user identification system 108 can utilize negative training data to train the user classification model 110 to determine when target users do not correspond to any minimum prior event users. For example, the target user identification system 108 can utilize a set of unknown users (e.g., users that are not part of the set of minimum prior event users) as training data. Accordingly, to train the user classification model 110, the target user identification system 108 can identify training events associated with an unknown user and can input the training events into the user classification model 110. Similar to the above discussion relating to minimum prior event users, the target user identification system 108 can also generate a prediction based on the training events of the unknown user. The target user identification system 108 can further compare the ground truth (e.g., the unknown user classification) with the prediction and can reduce the error that results from the comparison. By training the user classification model 110 using negative training data in this way, the target user identification system 108 can more accurately identify target users that do not correspond to any known users (e.g., identify the target user as a new user of the system).

In addition, the training user classification model 110 can update the user classification model 110 as additional user events are detected and additional users are added to a set of minimum prior event users. For example, upon detecting that a first user has five corresponding events, the target user identification system 108 can train the user classification model 110 with the five events of the first user. In this manner, the target user identification system 108 can actively update the user classification model 110 as additional users are added to the set of minimum prior event users. Moreover, as additional events are detected and correlated to users within the user information database 112, the target user identification system 108 can accurately identify more and more target users.

As described above, although the user classification model 110 of FIG. 3 is a deep neural network, the target user identification system 108 can train and utilize any number of machine learning models such as a nearest neighbor algorithm, a random forest algorithm, or a support vector machine. Accordingly, the target user identification system 108 can implement a process similar to the process illustrated in FIG. 3 to train the user classification model 110 to identify users.

For example, the target user identification system 108 can train a nearest neighbors algorithm by providing training examples (e.g., training events 302) in the form of vectors in a multidimensional feature space. The target user identification system 108 can store the feature vectors and corresponding labels (e.g., actual minimum prior event users that correspond with the training events 302). The target user identification system 108 can generate predicted corresponding minimum prior event user 304 based on which of k training samples is most frequent nearest to the training events 302.

In one or more embodiments where the user classification system 110 includes a nearest neighbor algorithm, prior to (or as part of) training the user classification model 110 the target user identification system 108 performs a linear transformation (e.g., principal component analysis or "PCA"). To illustrate, many features of an event may be related in one or way or another such as an entrance of a search query and a click of a button to execute the search query, which relationships can bias or skew results. In some embodiments, the target user identification system 108 is more robust to biases when the target user identification system 108 performs a linear transformation such as PCA to make the features of events uncorrelated.

In addition, the target user identification system 108 can train a random forest algorithm. In particular, the target user identification system 108 can train a random forest algorithm by bootstrap aggregating (sometimes called "bagging") tree learners to select a random sample with replacement of a training set (e.g., the training events 302). For example, given a training set $X=x_1, \ldots x_1$, with responses $Y=y_1, \ldots, y_n$, the target user identification system 108 can "bag" B times to select a random sample with replacement and fit trees to the random samples with replacement. Thus, the target user identification system 108 can generate predictions (e.g., predicted corresponding minimum prior event users) by taking a majority vote to determine which actual minimum prior event user 308 corresponds to the predicted corresponding minimum prior event user 304.

Furthermore, the target user identification system 108 can train an SVM by, given a set of training events 302, assigning the training events 302 to one of two possible classes with the largest margin. For example, given a training dataset of n points in the form $(\vec{x}_1, y_1), \ldots (\vec{x}_n, y_n)$, where $y_i$ are either $-1$ or $1$, each indicating the class to which the point $\vec{x}_i$ belongs, the target user identification system determines the maximum-margin hyperplane that divides the group of points $\vec{x}_i$ for which $y_i=1$ from the group of points for which $y_i=-1$, which the target user identification system 108 defines so that the distance between the hyperplane and the nearest point $\vec{x}_i$ from either group is maximized. For multiple-class classification, on the other hand, the target user identification system 108 can follow a one-versus-one scheme.

As mentioned above, in one or more embodiments, the target user identification system 108 determines an event number threshold. In particular, the target user identification system 108 can determine an event number threshold that causes one or more user classification models to converge (e.g., converge to accurately identify target users as additional events are detected).

Indeed, in using a Bayesian generative model (e.g., the user classification model 110) there is a prior and, given additional data, the posterior probability can be determined using the prior and incoming data. However, such a Bayesian model may or may not converge, as it is an iterative model. Convergence of a Bayesian model can be dependent on having correct (sufficient) prior information. The target user identification system 108 can determine sufficient prior information (e.g., an event number threshold). Specifically, the target user identification system 108 can (repeatedly) select test event number thresholds, identify a test set of users, generate (train) test user classification models, apply test user classification models to test users, determine accuracy metrics for the test user classification models, and identify the event number threshold that will result in convergence.

Figure 4A:
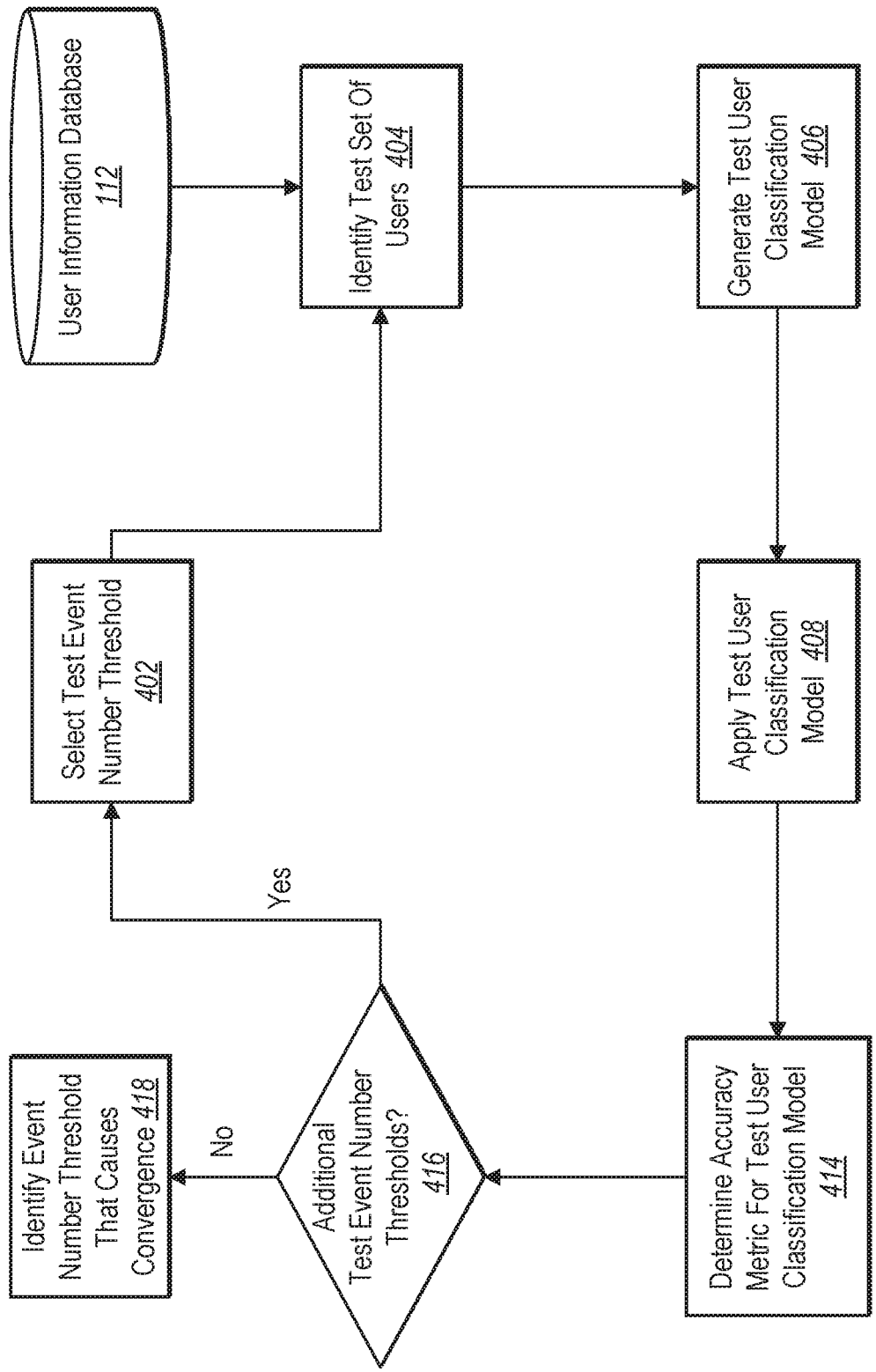
FIGS. 4A-4C illustrate determining an event number threshold for one or more user classification models in accordance with one or more embodiments.
Figures 4B, 4C:
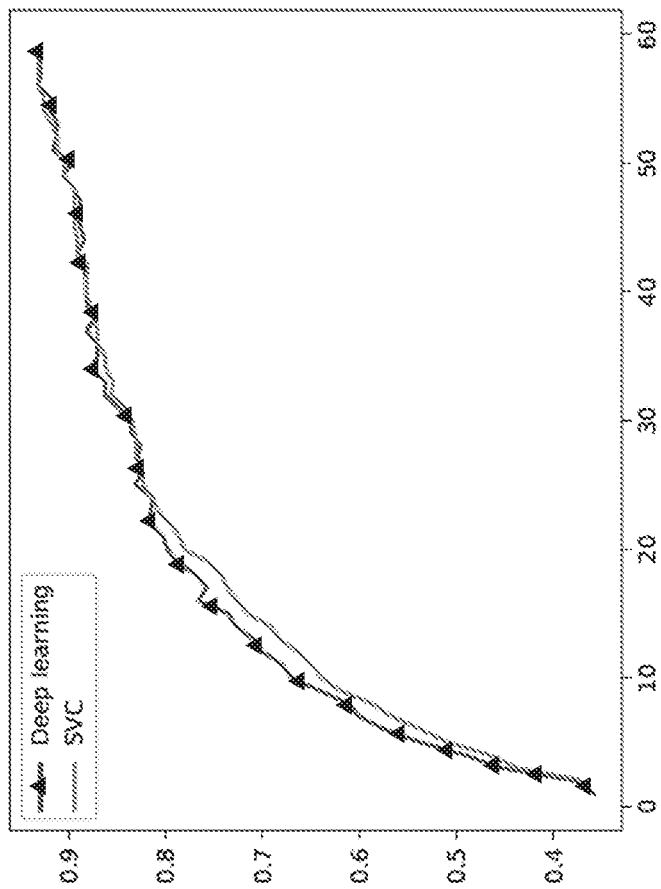

For example, FIGS. 4A-4C illustrate determining an event number threshold in accordance with one or more embodiments. Specifically, FIG. 4A illustrates a user information database (e.g., the user information database 112) that includes user-related information such as events associated with minimum prior event users. As shown, the target user identification system 108 performs a number of acts to determine an event number threshold—i.e., a number of events that causes convergence of the user classification model 110.

FIG. 4A illustrates acts 402-418 for determining and utilizing an event number threshold. As shown, the target user identification system 108 performs an act 402 of selecting a test event number threshold. In particular, the target user identification system 108 selects a random number or a user-selected number of events to use as the event number threshold. For example, the target user identification system 108 can select a test event number threshold of 1 event, 5 events, 10 events, etc.

Based on the selected test event number threshold, the target user identification system 108 accesses the user information database 112 and performs an act 404 of identifying a test set of users. For example, the target user identification system 108 identifies a test set of users by identifying a set of known users within the user information database 112 that satisfy the test event number threshold—i.e., that are associated with at least the test event number threshold of events.

As also shown, the target user identification system 108 performs an act 406 to generate a test user classification model. In particular, the target user identification system 108 generates a test user classification model 108 such as a test deep neural network, a test nearest neighbor algorithm, a test random forest algorithm, or a test SVM. The target user identification system 108 generates (e.g., trains) the test user classification model based on the test set of users. Thus, the test user classification model is trained based on a test set of users that satisfy the selected test event number threshold.

Moreover, the target user identification system 108 performs an act 408 to apply the test user classification model (e.g., to a set of additional users). In particular, the target user identification system 108 utilizes an additional set of users as input for the test user classification model. Using the additional set of users, the target user identification system 108 can generate predicted classifications for the additional set of users. For example, the target user identification system 108 generates a predicted classification for each additional user within the additional set of users.

In addition to generating predicted classifications, the target user identification system 108 also performs an act 414 of determining an accuracy metric for the test user classification model. For example, the act 414 can include comparing the predicted classifications with known user classifications for the set of additional users. By comparing the predicted classifications with known user classifications, the target user identification system 108 can determine an accuracy metric for the test user classification model. Indeed, the target user identification system 108 can determine how accurately the user classification model identifies users. For example, the target user identification system 108 can determine an accuracy metric such as 40%, 50%, etc.

As illustrated in FIG. 4A, the target user identification system 108 can perform an act 416 to determine whether there are additional test event number thresholds. In particular, the target user identification system 108 can test a predefined number of test event number threshold. Thus, if the target user identification system 108 has not tested each potential test event number threshold in the predefined number of test event number thresholds, the target user identification system 108 determines that there are additional test event number thresholds and proceeds to act 402 again. Accordingly, the target user identification system 108 selects a new test event number threshold and repeats the acts 404-416 as described above.

On other hand, the target user identification system 108 can determine that there are no more test event number thresholds to test and can therefore proceed to perform an act 418 to identify an event number threshold that causes the test user classification model to converge. To elaborate, the target user identification system 108 can identify those test event number thresholds that satisfy a particular accuracy metric threshold as determined in act 414. For example, the target user identification system 108 can determine that a test event number threshold of at least 50% causes the test user classification model to converge. Additionally, the target user identification system 108 can determine a minimum test event number threshold that causes the test user classification model to converge. Indeed, the target user identification system 108 can compare each of the test event number threshold that cause convergence (i.e., that result in a user classification model that satisfies the accuracy metric threshold) of the test user classification model.

As just mentioned, the target user identification system 108 can generate a plurality of accuracy metrics for test user classification models and identify an event number threshold utilizing the accuracy metrics. For example, FIGS. 4B and 4C illustrate accuracy metrics for two different user classification models, a deep neural network and SVM, in accordance with one or more embodiments.

As shown, in FIGS. 4B and 4C, the target user identification system 108 utilizes a plurality of test event number thresholds 430 (e.g., 1, 2, 3, 4, . . . , 50, and 59) to train user classification models. Moreover, the target user identification system 108 determines accuracy metrics 432a, 432b. Thus, FIG. 4B illustrates a graph depicting of the accuracy metrics 432a, 432b shown in FIG. 4C. As illustrated, both the deep neural network and the SVM increase in accuracy as the event number threshold increases. More specifically, as the minimum number of events for a given user required to consider the user as part of the set of minimum prior event users increases, the accuracy of the target user identification system 108 also increases.

As shown in FIG. 4C, the accuracy of the deep neural network and the SVM are both above 90% when the event number threshold is 59 events. To optimize the user classification model 110 by implementing an event number threshold equal to the minimum number of events that causes the user classification model 110 converge, however, the target user identification system 108 can utilize an event number threshold that results in an accuracy of greater than 50%. Accordingly, as illustrated in FIG. 4C, the minimum number of events that causes a deep neural network user classification model 110 to converge is five events. Likewise, the minimum number of events that causes the SVM to converge is also five events. Thus, in some embodiments, the target user identification system 108 utilizes an event number threshold of five events to optimize the user classification model 110 for both accuracy and the number of possible minimum prior event users.

Although the embodiment of FIGS. 4A-4C select the same event number threshold (five events) for two different user classification models, in one or more embodiments, the target user identification system can select a different event number threshold for different user classification models. For example, the target user identification system 108 can select a first event number threshold (e.g., five events) for a first user classification model (e.g., deep neural network) and a second event number threshold (e.g., four or six events) for a second user classification model (e.g., nearest neighbor).

In addition, although the embodiment of FIGS. 4A-4C illustrate selecting an event number threshold based on a particular accuracy (e.g., 50% to cause convergence), the target user identification system 108 can select an event number threshold based on a different accuracy metric. For instance, the target user identification system 108 can select an event number threshold based on an accuracy metric of 60%, 70%, or 80% (e.g., to cause convergence at a faster rate). Moreover, the target user identification system 108 can utilize a different accuracy metric for different user classification models. As an example, to use an ensemble method (like random forest or deep neural networks or boosting methods), one needs to have each model in the ensemble to be a weak learner for convergence which means that each model should have an accuracy of at least 50%. As anther example, using iterative methods for user classification may require a minimum accuracy of 50% for convergence.

Furthermore, although FIGS. 4A-4C illustrate selecting an event number threshold that comprises a minimum number of events, the target user identification system 10 can also select an event number threshold that comprises a maximum number of events (or a range of events).

Figure 5:
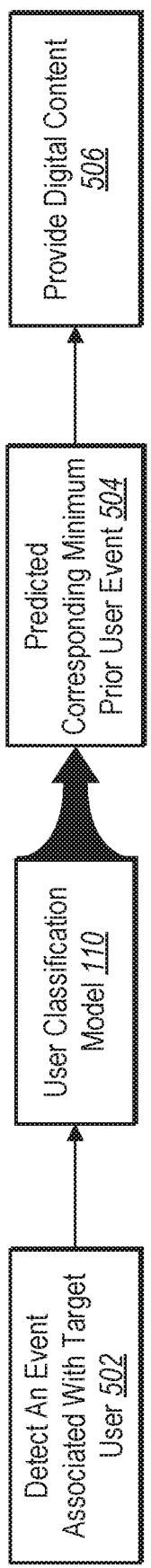
FIG. 5 illustrates identifying a target user and providing digital content to the target user in accordance with one or more embodiments.

As mentioned above, the target user identification system 108 can utilize a user classification model 110 trained based on an event number threshold to identify a target user. FIG. 5 illustrates a process by which the target user identification system 108 can utilize the user classification model 110 to identify a target user. As described above, the target user identification system 108 detects an event associated with a target user and utilizes the user classification model 110 to identify the user based on the detected event.

As illustrated in FIG. 5, the target user identification system 108 performs an act 502 of detecting an event associated with a target user. In particular, the target user identification system 108 can detect an event associated with a client device (e.g., the client device 114a) of a target user (e.g., the user 118a). For example, the target user identification system 108 can detect a user visiting a webpage, clicking a link, entering a search query, or some other event. The target user identification system 108 can then input the detected event into the trained user classification model 110.

Utilizing the trained user classification model 110, the target user identification system 108 determines a user from among the minimum prior event users that corresponds to the target user. In particular, the target user identification system 108 utilizes the user classification model 110 to analyze the detected event associated with the target user to generate a predicted corresponding minimum prior event user 504. In this way, the target user identification system 108 identifies the target user as, for example, user 118a based on the single event detected in the act 502.

To generate the predicted corresponding minimum prior event user 504, the target user identification system 108 utilizes the user classification model 110 to determine probabilities that the target user associated with the newly detected event corresponds to a particular minimum prior event user from the set of minimum prior event users. More specifically, the target user identification system 108 utilizes the user classification model 110 to determine, for each minimum prior event user, a probability that the target user corresponds to the given minimum prior event users. For example, as mentioned above, the target user identification system 108 can determine a first probability (e.g., 10%) that a target user is a first minimum prior event user, a second probability (e.g., 50%) that a target user is a second minimum prior event user, and a third probability (e.g., 20%) that a target user is a third minimum prior event user.

Based on these probability determinations, the user classification model 110 outputs a predicted corresponding minimum prior event user 504. For instance, the target user identification system 108 can utilize the user classification model 110 to identify the minimum prior event user with the highest probability as the predicted corresponding minimum prior event user 504. To illustrate, the target user identification system 108 can compare the probability corresponding to the first minimum prior event user (e.g., 10%), the probability corresponding to the second prior event user (e.g., 50%), and the probability corresponding to the third minimum prior event user (e.g., 20%) and select the minimum prior event user with the highest probability (i.e., the second minimum prior event user) as the predicted corresponding minimum prior event user 504.

To elaborate, as described above, the target user identification system 108 can compute the probability distribution of each minimum prior event user within the user information database 112. Thus, for the ith minimum prior event user, the distribution can be represented as a Gaussian distribution of $N(\mu_i, \sigma_i)$, where $\mu_i$ is the mean and $\sigma_i$ is the standard deviation. Based on the distribution of each user, the target user identification system 108 can compute the probabilities of the target user belonging to any of the user distributions. For instance, the target user identification system 108 can determine a probability that a user corresponding to the target user has the same distribution as an already-established minimum prior event user distribution.

Additionally or alternatively, the target user identification system 108 can train the user classification model 110 to classify a target user as a new or unknown user. For instance, in one or more embodiments, the target user identification system can apply a probability threshold to determine that a target user is a new or unknown user. In particular, the target user identification system 108 can detect an event associated with a target user (act 502) and can generate, by way of the user classification model 110, probabilities that the target user corresponds to known users (e.g., minimum prior event users). The target user identification system 108 can the apply a probability threshold to determine that the user does not correspond to any of the known users.

For instance, the target user identification system 108 can apply a threshold of 10%, 20%, etc., and can determine that, in cases where the target user identification system 108 does not calculate any probabilities greater than the match threshold, the target user is a new user or an unknown user. To illustrate, as discussed above, the target user identification system 108 generates probability distributions that the target user corresponds to minimum prior event users. In some cases, the target user identification system 108 determines that none of the probabilities satisfy the match threshold. Therefore, in these cases, the target user identification system 108 determines that the target user is a new user or an unknown user.

In some embodiments, as discussed above with reference to FIG. 3, the target user identification system 108 can identify new or unknown users based on training the user classification model 110 to determine a probability that a user does not correspond to any minimum prior event user (e.g., by training using a negative training process). In particular, the target user identification system 108 can determine (e.g., based on training the user classification model 110 using negative training data such as training events associated with unknown users) a probability that the target user does not correspond to any of the known users within the user information database 112. Indeed, the target user identification system 108 can determine a probability that the target user is an unknown user and does not correspond to any of the minimum prior event users. In one or more embodiments, the target user identification system 108 compares the probability that the target user is an unknown user with probabilities that a target user is a minimum prior event user. Based on the comparison (e.g., based on the highest priority), the target user identification system 108 can determine that a target user is a new or unknown user.

Upon determining the probability of the target user corresponding to each probability distribution (e.g., for each distribution of the set of minimum prior event users), the target user identification system 108 identifies the minimum prior event user with the highest probability as the predicted corresponding minimum prior event user 504.

In addition to identifying the target user by determining that the target user corresponds to a particular user from among the set minimum prior event users, the target user identification system 108 further performs an act 506 of providing digital content to the target user. In particular, the target user identification system 108 provides digital content to a client device (e.g., client device 114a) associated with the target user. To provide digital content tailored specifically for the target user, the target user identification system 108 can access the user information database 112. More specifically, the target user identification system 108 can identify digital content that the target user has previously accessed, shown interest in, or can identify digital content similar to content that interests the target user.

To elaborate, the target user identification system 108 can provide digital content by customizing an interface of a particular application (e.g., a SAAS application) with features, tools, and other attributes that the target user has previously set up for the given application. In other embodiments, the target user identification system 108 can provide digital content by prioritizing search results in a search engine interface according to previous interests of the target user (e.g., by placing links that the target user is more likely to select higher up in the results). In still other embodiments, the target user identification system 108 can provide digital content by customizing a social networking feed with content associated with other users who are linked with the target user. The target user identification system 108 can still further provide digital content by accessing files that the target user has saved during previous sessions of user activity and either transferring the files or otherwise making the files available for download to the client device associated with the target user.

Figure 6:
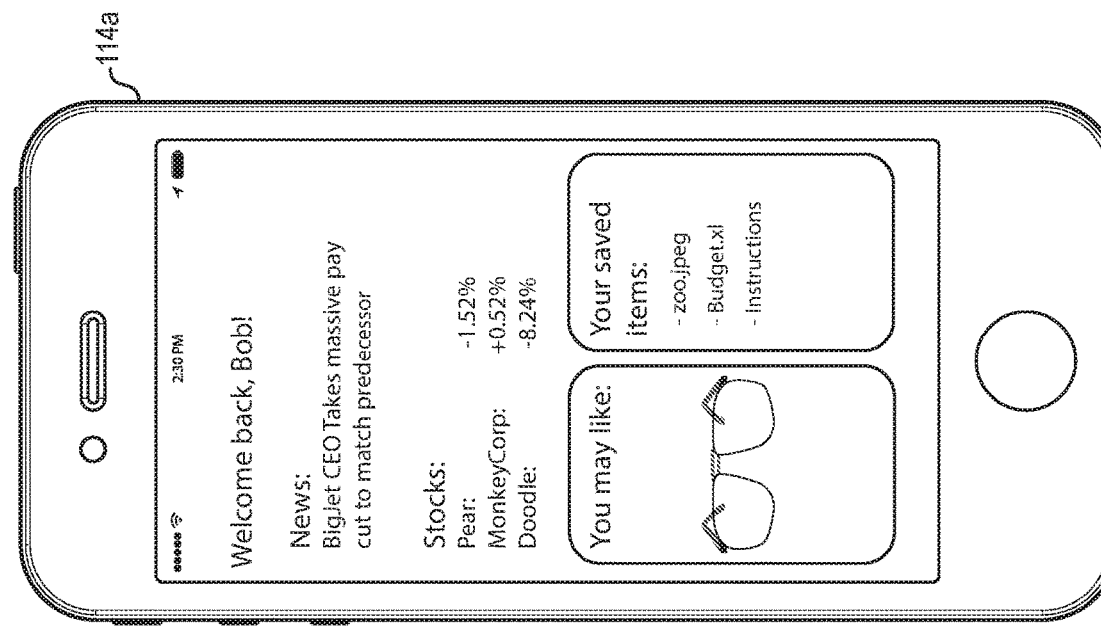
FIG. 6 illustrates an example client device of a target user and providing customized digital content to the example client device in accordance with one or more embodiments.

As mentioned, the target user identification system 108 can provide digital content to a client device associated with a target user. Indeed, FIG. 6 illustrates an example client device 114a associated with a target user. As shown in FIG. 6, the target user identification system 108 provides digital content to a smartphone. In particular, the target user identification system 108 provides digital content for a customized webpage for the target user. To illustrate, the target user identification system 108 provides digital content including a welcome message ("Welcome back, Bob!") including the name (or other identifier) of the target user ("Bob"), a link to a news article of interest to the target user, daily stock performance of stocks associated with the target user, access to files that the target user has previously saved, and a link to purchase a product (e.g., glasses) of interest to the target user.

While FIG. 6 illustrates a particular example of digital content that the target user identification system 108 can provide to the client device 114a, the target user identification system 108 can select and provide other digital content as well. As described above, the target user identification system 108 can select and provide digital content customized specifically for the target user, including specific application content, webpage content, etc., whether the target user utilizes a mobile device or a desktop computer.

Figure 7:
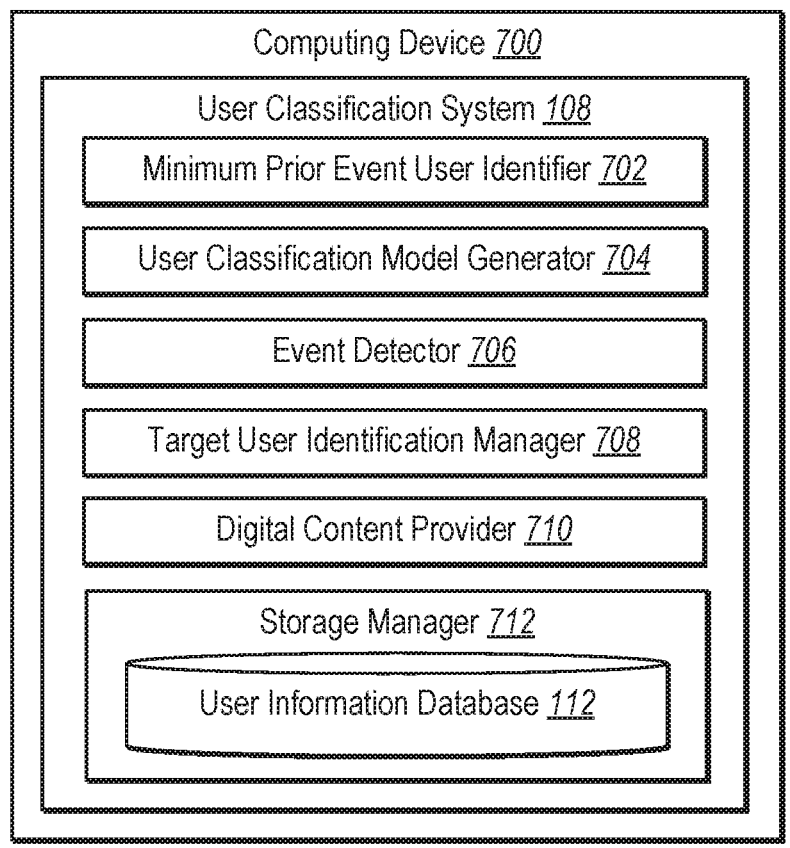
FIG. 7 illustrates a schematic diagram of a target user identification system in accordance with one or more embodiments.

Looking now to FIG. 7, additional detail will be provided regarding components and capabilities of the target user identification system 108. Specifically, FIG. 7 illustrates an example schematic diagram of the target user identification system 108 on an example computing device 700 (e.g., one or more of client devices 114 and/or server(s) 104). As shown in FIG. 7, the target user identification system 108 may include a minimum prior event user identifier 702, a user classification model generator 704, an event detector 706, a target user identification manager 708, a digital content provider 710, and a storage manager 712.

As mentioned, the target user identification system 108 includes a minimum prior event user identifier 702. In particular the minimum prior event user identifier 702 can communicate with the storage manager 712 to determine, identify, and/or specify users (e.g., users within the user information database 112) who satisfy an event number threshold. Indeed, the minimum prior event user identifier 702 can set an event number threshold at a specific number of events (e.g., five events), and the minimum prior event user identifier 702 can identify those users for whom the target user identification system 108 has detected at least the event number threshold of events in the past. Furthermore, the minimum prior event user identifier 702 can communicate with the storage manager 712 to store information relating to the set of minimum prior event users within the user information database 112.

Indeed, as illustrated in FIG. 7, the target user identification system 108 includes an event detector 706. In particular, the event detector 706 can detect, identify, determine, gather, collect, receive, and/or ascertain events associated with particular users. For example, the event detector 706 can detect events associated with client devices 114 of users 118, as well as events for a target user. In addition, the event detector 706 can determine, discover, access, retrieve, or otherwise identify event features associated with each individual event. The event detector 706 can further communicate with the storage manager 712 to store the events and their accompanying event features in the user information database 112.

FIG. 7 further illustrates the target user identification system 108 including a user classification model generator 704. The user classification model generator 704 can generate, train, teach, and/or create a user classification model (e.g., user classification model 110) such as a deep neural network, a nearest neighbor algorithm, a random forest algorithm, or a support vector machine. In particular, the user classification model generator 704 can communicate with the event detector 706 and/or the storage manager 712 to access training data to generate a user classification model. Indeed, as described above, the user classification model generator 704 can access the set of minimum prior event users and the corresponding events to use as training data for a user classification model.

FIG. 7 also illustrates that the target user identification system 108 includes a target user identification manager 708. In particular, the target user identification manager 708 can identify, determine, correlate, and/or calculate probabilities that a target user corresponds with a given minimum prior event user (e.g., utilizing a trained user classification model from the user classification model generator 705). For example, the target user identification manager 708 can determine, for each of the minimum prior event users within the set of minimum prior event users, a probability that the target user corresponds with the given minimum prior event user. Indeed, in accordance with the disclosure above, the target user identification manager 708 can utilize a trained user classification model to determine such probabilities. In some embodiments, the target user identification manager 708 can select the minimum prior event user with the highest probability of corresponding to (e.g., matching) the target user as the identity of the target user.

As mentioned, FIG. 7 further illustrates that the target user identification system 108 includes a digital content provider 710. In particular, the digital content provider 710 can provide, send, relay, and/or transmit digital content to a client device (e.g., client device 114a). In accordance with the disclosure above, the digital content provider 710 can customize or tailor digital content specific to a target user and can provide the customized digital content to a client device associated with the target user. For example, upon identifying the target user as user 118a (e.g., by way of the target user identification manager 708), the digital content provider 710 can select and provide digital content associated with user 118a to client device 114a.

As illustrated in FIG. 7, the target user identification system 108 further includes a storage manager 712. The storage manager 712 includes a user information database 112. Accordingly, the storage manager 712 can communicate with other components of the target user identification system 108 to store data pertaining to user information such as, but not necessarily limited to, digital content associated with each user, events (including event features) associated with each user, and identifiers for those users who belong to the set of minimum prior event users.

In one or more embodiments, each of the components of the target user identification system 108 are in communication with one another using any suitable communication technologies. Additionally, the components of the target user identification system 108 can be in communication with one or more other devices including one or more of the client devices 114 described above. It will be recognized that although the components of the target user identification system 108 are shown to be separate in FIG. 7, any of the subcomponents may be combined into fewer components, such as into a single component, or divided into more components as may serve a particular implementation. Furthermore, although the components of FIG. 7 are described in connection with the target user identification system 108, at least some of the components for performing operations in conjunction with the target user identification system 108 described herein may be implemented on other devices within the environment.

The components of the target user identification system 108 can include software, hardware, or both. For example, the components of the target user identification system 108 can include one or more instructions stored on a computer-readable storage medium and executable by processors of one or more computing devices (e.g., the computing device 700). When executed by the one or more processors, the computer-executable instructions of the target user identification system 108 can cause the computing device 700 to perform the patch matching methods described herein. Alternatively, the components of the target user identification system 108 can comprise hardware, such as a special purpose processing device to perform a certain function or group of functions. Additionally or alternatively, the components of the target user identification system 108 can include a combination of computer-executable instructions and hardware.

Furthermore, the components of the target user identification system 108 performing the functions described herein may, for example, be implemented as part of a stand-alone application, as a module of an application, as a plug-in for applications including content management applications, as a library function or functions that may be called by other applications, and/or as a cloud-computing model. Thus, the components of the target user identification system 108 may be implemented as part of a stand-alone application on a personal computing device or a mobile device. Alternatively or additionally, the components of the target user identification system 108 may be implemented in any application that allows creation and delivery of marketing content to users, including, but not limited to, applications in ADOBE CREATIVE CLOUD and/or ADOBE MARKETING CLOUD, such as ADOBE CAMPAIGN, ADOBE ANALYTICS, ADOBE MEDIA OPTIMIZER, and ADOBE PHOTOSHOP. "ADOBE," "CREATIVE CLOUD," "MARKETING CLOUD," "CAMPAIGN," "ANALYTICS," "MEDIA OPTIMIZER," and "PHOTOSHOP" are registered trademarks of Adobe Systems Incorporated in the United States and/or other countries.

FIGS. 1-7, the corresponding text, and the examples provide a number of different systems, methods, and non-transitory computer readable media for providing digital content to users based on identifying users using a user classification model. In addition to the foregoing, embodiments can also be described in terms of flowcharts comprising acts for accomplishing a particular result. For example, FIG. 8 illustrates a flowchart of an example sequence of acts in accordance with one or more embodiments.

Figure 8:
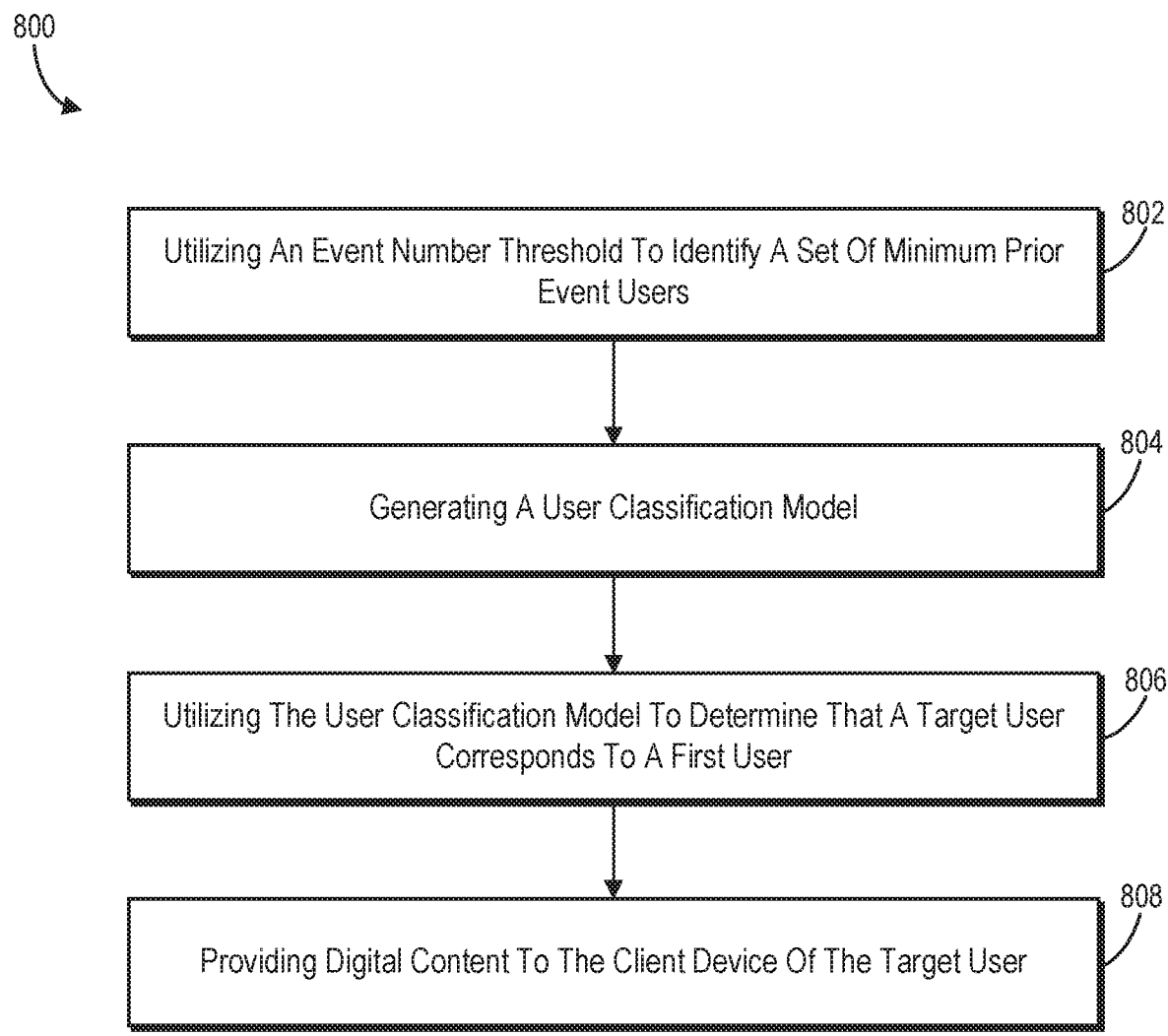
FIG. 8 illustrates a flowchart of a series of acts for providing digital content to a target user based on identifying the target user by way of a user classification model in accordance with one or more embodiments.

While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer readable medium can comprise instructions, that when executed by one or more processors, cause a computing device to perform the acts of FIG. 8. In still further embodiments, a system can perform the acts of FIG. 8. Additionally, the acts described herein may be repeated or performed in parallel with one another or in parallel with different instances of the same or other similar acts.

FIG. 8 illustrates an example series of acts 800 of providing digital content to a target user based on identifying the target user by way of a user classification model. In particular, the series of acts 800 can include an act 802 of utilizing an event number threshold to identify a set of minimum prior event users. For example, the act 802 can involve utilizing an event number threshold to identify a set of minimum prior event users, wherein each minimum prior event user within the set of minimum prior event users satisfies the event number threshold. The event number threshold can refer to a number of events to cause the user classification model to converge. In some embodiments, the event number threshold is five. Moreover, the event number threshold can include a minimum number of events previously identified in relation to the first minimum prior event user to accurately determine that the target user is the first minimum prior event user. Indeed, this threshold can represent the minimum amount of information, already collected about a user, so user identification i.e., comparing any incoming user with the users of having the event number threshold can be accurately done. Further, in one or more embodiments, an event is a random event which has random amount of information or variation and as a result it has an average (of all possible events) amount of variation or information.

As shown, the series of acts 800 can include an act 804 of generating a user classification model. In particular, the act 804 can involve generating, based on the identified set of minimum prior event users, a user classification model. For example, the act 804 can further involve determining, for each of the set of minimum prior event users, a probability that the target user corresponds to the minimum prior event user. The series of acts 800 can further include an act of comparing the probabilities for the target user corresponding to each of the set of minimum prior event users. In particular, the act of comparing the probabilities can involve determining a highest probability from among the probabilities for the target user corresponding to each of the set of minimum prior event users. In addition, the predictive user behavior model can include one or more of a deep neural network, a nearest neighbor algorithm, a random forest algorithm, or a support vector machine.

In embodiments where the user classification model is a deep neural network, the series of acts can include an act of training the deep neural network to determine that the target user corresponds to the first minimum prior event user by utilizing the set of minimum prior event users as training data.

As also illustrated, the series of acts 800 can include an act 806 of utilizing the user classification model to determine that a target user corresponds to a first user. In particular, the act 806 can involve, in response to detecting an event associated with a client device of a target user, utilizing the user classification model to determine that the target user corresponds to a first minimum prior event user from the set of minimum prior event users. The act 806 can additionally or alternatively involve determining a first probability that the target user corresponds to the first minimum prior event user and a second probability that the target user corresponds to a second minimum prior event user. The series of acts 800 can also involve an act for comparing the first probability that the target user corresponds to the first minimum prior event user and the second probability that the target user corresponds to the second minimum prior event user. For example, the act 806 can further involve determining that the first probability is greater than the second probability.

In addition, the series of acts 800 can include an act 808 of providing digital content to the client device of the target user. In particular, the act 808 can involve providing digital content to the client device of the target user based on the determination that the target user corresponds to the first minimum prior event user. For example, the act 808 can further involve identifying digital content associated with the first minimum prior event user, and providing the identified digital content associated with the first minimum prior event user to the client device of the target user. The act 808 can additionally or alternatively involve selecting digital content based on the determination that the target user corresponds to the first minimum prior event user and providing the selected digital content to the client device of the target user.

Figure 9:
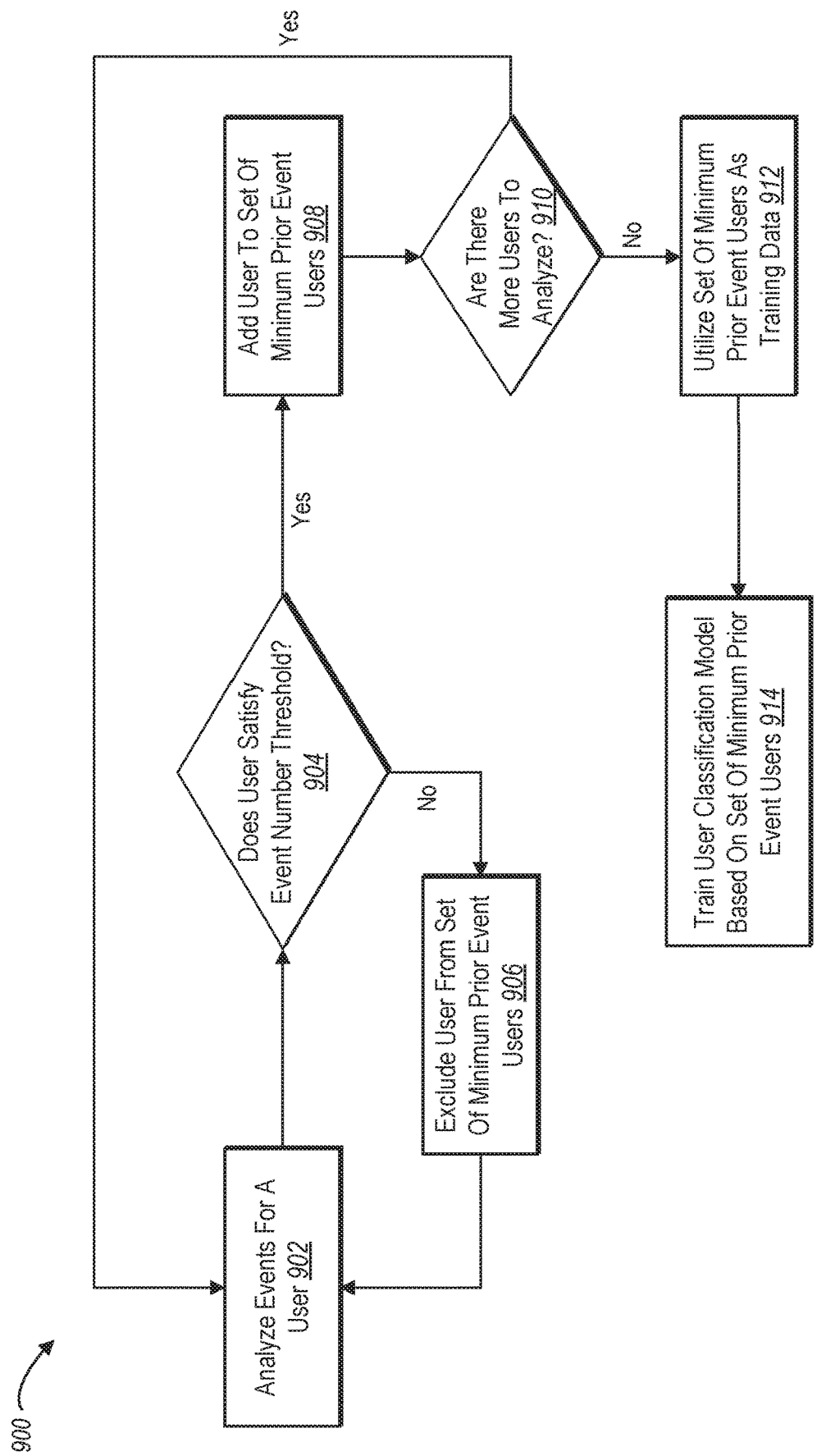
FIG. 9 illustrates a series of acts in a step for generating a user classification model based on an event number threshold in accordance with one or more embodiments.

As mentioned above, the target user identification system 108 can generate a user classification model 110 based on identifying a set of minimum prior event users. Indeed, FIG. 9 illustrates a step 900 for generating a user classification model based on an event number threshold in accordance with one or more embodiment of the target user identification system 108. The step 900 for generating a user classification model can include the below description of FIG. 9, in addition to relevant methods and techniques described elsewhere in this disclosure.

As shown in FIG. 9, the step 900 includes acts 902-910. In particular, the step 900 includes an act 902 of analyzing events for a user. For example, as described above, the target user identification system 108 analyzes events for a particular user by accessing information within the user information database 112. Specifically, in one or more embodiments, the target user identification system 108 identifies events such as logins, clicks, etc., associated with a particular user.

The flow 900 also includes an act 904 of determining whether the user satisfies an event number threshold. In particular, the target user identification system 108 can identify an event number threshold that causes the user classification model 110 to converge. Moreover, the target user identification system 108 can determine whether the target user identification system 108 has detected at least the event number threshold of events for the particular user.

As shown, in cases where the target user identification system 108 determines that the user does not satisfy the event number threshold, the target user identification system 108 performs act 906 to exclude the user from the set of minimum prior event users and repeats act 902 to analyze events for a different user.

On the other hand, in cases where the target user identification system 108 determines that the user does satisfy the event number threshold, the target user identification system 108 performs act 908 to add the user to the set of minimum prior event users. Upon adding the user to the set of minimum prior event users, the target user identification system 108 further performs act 910 to determine whether there are more users to analyze. For example, the target user identification system 108 determines whether there are more users for whom the target user identification system 108 has detected events and that have not yet been either excluded from the set of minimum prior event users or added to the set of minimum prior event users.

In response to determining that there are more users to analyze, the target user identification system 108 continues to repeat act 902 and the subsequent acts until each user is either added to the set of minimum prior event users or excluded from the set of minimum prior event users. Indeed, as shown in FIG. 9, the target user identification system 108 determines that there are no more users to analyze and continues to perform act 912 to utilize the set of minimum prior event users as training data. As described above, the target user identification system 108 utilizes the events associated with, and the identify of, each of the set of minimum prior event users to train a user classification model (e.g., the user classification model 110). Indeed, as illustrated in FIG. 9, the target user identification system 108 performs act 914 of training a user classification model based on the set of minimum prior event users in accordance with the disclosure herein.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
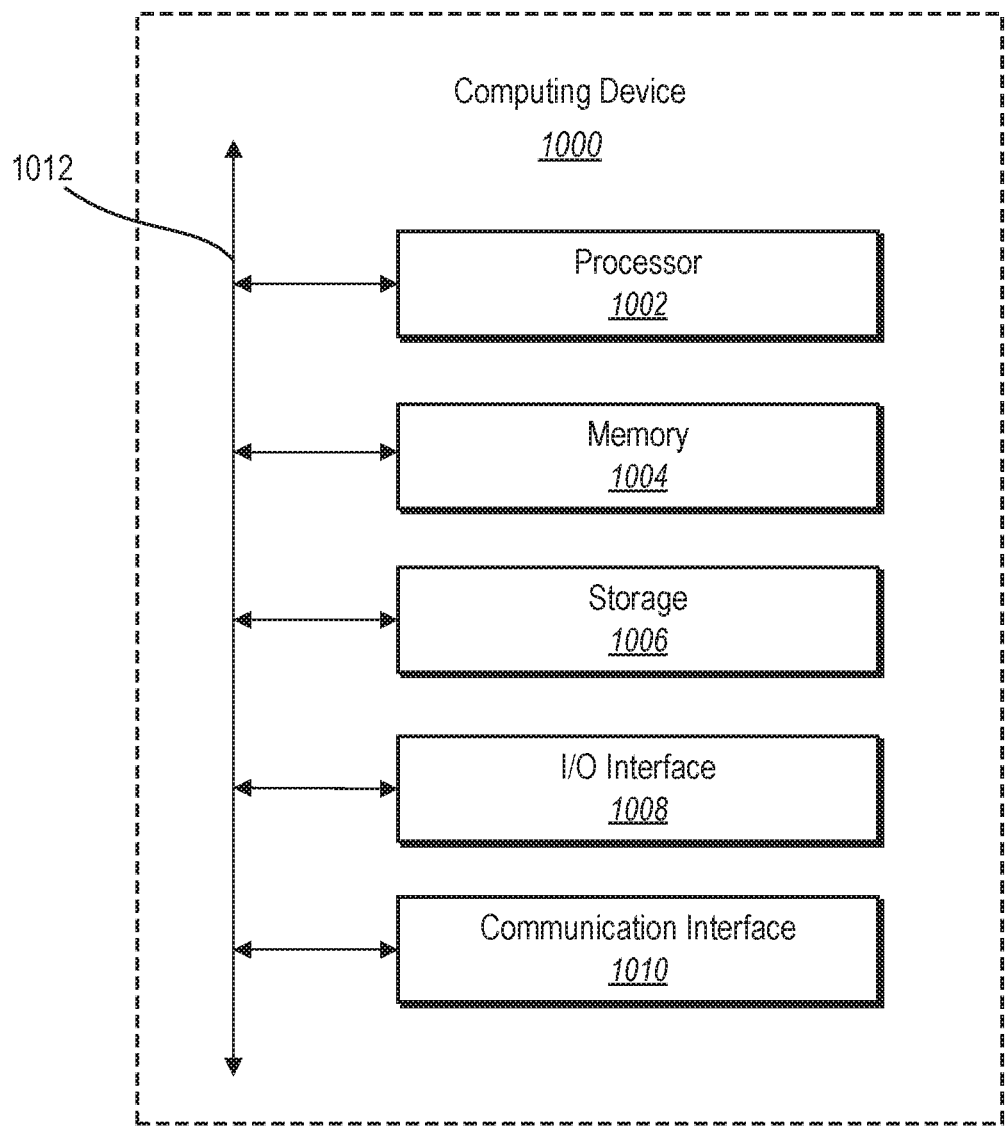
FIG. 10 illustrates a block diagram of an example computing device in accordance with one or more embodiments.

FIG. 10 illustrates, in block diagram form, an example computing device 1000 (e.g., computing device 700, client device 114a, and/or server(s) 104) that may be configured to perform one or more of the processes described above. One will appreciate that the target user identification system 108 can comprise implementations of the computing device 1000. As shown by FIG. 10, the computing device can comprise a processor 1002, memory 1004, a storage device 1006, an I/O interface 1008, and a communication interface 1010. Furthermore, the computing device 1000 can include an input device such as a touchscreen, mouse, keyboard, etc. In certain embodiments, the computing device 1000 can include fewer or more components than those shown in FIG. 10. Components of computing device 1000 shown in FIG. 10 will now be described in additional detail.

In particular embodiments, processor(s) 1002 includes hardware for executing instructions, such as those making up a computer program. As an example, and not by way of limitation, to execute instructions, processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, storage device 1006 can comprise a non-transitory storage medium described above. The storage device 1006 may include a hard disk drive (HDD), flash memory, a Universal Serial Bus (USB) drive or a combination of these or other storage devices.

The computing device 1000 also includes one or more input or output ("I/O") devices/interfaces 1008, which are provided to allow a user to provide input to (such as user strokes), receive output from, and otherwise transfer data to and from the computing device 1000. These I/O devices/interfaces 1008 may include a mouse, keypad or a keyboard, a touch screen, camera, optical scanner, network interface, modem, other known I/O devices or a combination of such I/O devices/interfaces 1008. The touch screen may be activated with a writing device or a finger.

The I/O devices/interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1008 is configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 can provide one or more interfaces for communication (such as, for example, packet-based communication) between the computing device and one or more other computing devices 800 or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can comprise hardware, software, or both that couples components of computing device 1000 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. In a digital medium environment for automatically providing personalized digital content to client devices of individual users, a computer-implemented method for generating and utilizing event-number-specific classification models to identify client devices corresponding to individual users comprising:
 a step for generating a user classification model based on an event number threshold, wherein the user classification model comprises one or more of a deep neural network, a nearest neighbor algorithm, a random forest algorithm, or a support vector machine;

in response to detecting an event associated with a client device of a target user, utilizing the generated user classification model to determine that the target user corresponds to a known user from a set of known users used as training data for the user classification model; and providing digital content to the client device of the target user based on the determination that the target user corresponds to the known user.

2. The method of claim 1, wherein the event number threshold is 5.

3. The method of claim 1, wherein the event number threshold comprises a minimum number of events to cause the user classification model to converge.

4. The method of claim 3, wherein an event comprises an action performed by a user via a client device.

5. The method of claim 1, wherein providing digital content to the client device of the target user comprises:
identifying digital content associated with the known user; and
providing the identified digital content associated with the known user to the client device of the target user.

6. A non-transitory computer readable medium for generating and utilizing event-number-specific classification models to identify client devices corresponding to individual users, the non-transitory computer readable medium comprising instructions that, when executed by at least one processor, cause a computer device to:
utilize an event number threshold to identify a set of minimum prior event users, wherein each minimum prior event user within the set of minimum prior event users satisfies the event number threshold;
generate, based on the identified set of minimum prior event users, a user classification model;
in response to detecting an event associated with a client device of a target user, utilize the user classification model to determine that the target user corresponds to a first minimum prior event user from the set of minimum prior event users; and
provide digital content to the client device of the target user based on the determination that the target user corresponds to the first minimum prior event user by:
identifying digital content associated with the first minimum prior event user; and
providing the identified digital content associated with the first minimum prior event user to the client device of the target user.

7. The non-transitory computer readable medium of claim 6, wherein the event number threshold is 5.

8. The non-transitory computer readable medium of claim 6, wherein the event number threshold comprises a number of events to cause the user classification model to converge.

9. The non-transitory computer readable medium of claim 6, wherein the instructions cause the computer device to determine that the target user corresponds to a first minimum prior event user by determining a first probability that the target user corresponds to the first minimum prior event user and a second probability that the target user corresponds to a second minimum prior event user.

10. The non-transitory computer readable medium of claim 9, further comprising instructions that, when executed by the at least one processor, cause the computer device to determine that the target user corresponds to the first minimum prior event user by comparing the first probability that the target user corresponds to the first minimum prior event user and the second probability that the target user corresponds to the second minimum prior event user.

11. The non-transitory computer readable medium of claim 10, wherein the instructions cause the computer device to determine that the target user corresponds to the first minimum prior event user by determining that the first probability is greater than the second probability.

12. The non-transitory computer readable medium of claim 6, wherein the user classification model comprises one or more of a deep neural network, a nearest neighbor algorithm, a random forest algorithm, or a support vector machine.

13. The non-transitory computer readable medium of claim 6, wherein the user classification model comprises a deep neural network; and
further comprising instructions that, when executed by the processor, cause the computer device to train the deep neural network to determine that the target user corresponds to the first minimum prior event user by utilizing the set of minimum prior event users as training data.

14. The non-transitory computer readable medium of claim 6, further comprising instructions that, when executed by the at least one processor, cause the computer device to utilize the event number threshold to identify the set of minimum prior event users by identifying users who have performed at least a threshold number of actions via client devices.

15. A system for generating and utilizing event-number-specific classification models to identify client devices corresponding to individual users comprising:
a processor; and
a non-transitory computer readable medium comprising instructions that, when executed by the processor, cause the system to:
utilize an event number threshold to identify a set of minimum prior event users, wherein each minimum prior event user within the set of minimum prior event users satisfies the event number threshold;
generate, based on the identified set of minimum prior event users, a user classification model trained to identify target users;
in response to detecting an event associated with a client device of a target user, utilize the user classification model to determine a first probability that the target user corresponds to a first minimum prior event user from the set of minimum prior event users and a second probability that the target user corresponds to a second minimum prior event user from the set of minimum prior event users; and
determine that the target user corresponds to the first minimum prior event user by comparing the first probability and the second probability.

16. The system of claim 15, wherein the event number threshold is 5.

17. The system of claim 15, wherein the event number threshold comprises a minimum number of events previously identified in relation to the first minimum prior event user to accurately determine that the target user is the first minimum prior event user.

18. The system of claim 15, further comprising instructions that, when executed by the processor, cause the system to:
select digital content based on the determination that the target user corresponds to the first minimum prior event user; and
provide the selected digital content to the client device of the target user.

19. The system of claim 15, wherein the instructions cause the system to determine that the target user corresponds to the first minimum prior event user by determining that first probability is greater than the second probability.

20. The system of claim 15, wherein the user classification model comprises a deep neural network; and
further comprising instructions that, when executed by the processor, cause the system to train the deep neural network to determine the first probability and the second probability by utilizing the set of minimum prior event users as training data.

* * * * *